US008353055B2

(12) United States Patent
Zhang et al.

(10) Patent No.: US 8,353,055 B2
(45) Date of Patent: *Jan. 8, 2013

(54) METHOD AND APPARATUS FOR PROCESSING RIGHTS OBJECT

(75) Inventors: Renzhou Zhang, Shenzhen (CN); Chen Huang, Shenzhen (CN); Weizhong Yuan, Shenzhen (CN); Zhipeng Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,212

(22) Filed: Jul. 2, 2012

(65) Prior Publication Data

US 2012/0272334 A1    Oct. 25, 2012

Related U.S. Application Data

(63) Continuation of application No. 12/980,050, filed on Dec. 28, 2010, which is a continuation of application No. PCT/CN2009/071174, filed on Apr. 7, 2009.

(30) Foreign Application Priority Data

Jul. 7, 2008  (CN) .......................... 2008 1 0130556

(51) Int. Cl.
 G06F 7/04 (2006.01)
 H04L 9/00 (2006.01)
(52) U.S. Cl. ................ 726/30; 726/26; 726/27; 726/28; 726/29; 713/161; 713/162; 713/163; 713/164; 713/165
(58) Field of Classification Search ...................... 726/30
See application file for complete search history.

(56) References Cited

U.S. PATENT DOCUMENTS

2002/0019814 A1    2/2002   Ganesan
2006/0031164 A1    2/2006   Kim
     (Continued)

FOREIGN PATENT DOCUMENTS

CN          1728039 A       2/2006
     (Continued)

OTHER PUBLICATIONS

Written Opinion of the International Searching Authority (translation) dated (mailed) Jul. 23, 2009, issued in related Application No. PCT/CN2009/071174, filed Apr. 7, 2009, Huawei Technologies Co., Ltd. (7 pgs.).

International Search Report dated (mailed) Jul. 23, 2009, issued in related Application No. PCT/CN2009/071174, filed Apr. 7, 2009, Huawei Technologies Co., Ltd. (5 pgs.).

(Continued)

*Primary Examiner* — Longbit Chai
(74) *Attorney, Agent, or Firm* — Conley Rose, P.C.; Grant Rodolph

(57) ABSTRACT

A method for upgrading a Rights Object (RO) includes: acquiring, by a Digital Rights Management (DRM) Agent, RO related information of the RO that requires updating from a Secure Removable Media (SRM) Agent; providing, by the DRM Agent, the RO related information to a Rights Issuer (RI), and obtaining a new RO from the RI; and interacting, by the DRM Agent, with the SRM Agent to upgrade the RO that requires updating on the SRM by means of the new RO. According to the embodiments of the present invention, the DRM Agent acquires RO related information which is stored on the SRM and does not have Move rights, and interacts with the RI to move the RO out from the SRM, so as to move the RO without the Move rights out from the SRM.

18 Claims, 12 Drawing Sheets

U.S. PATENT DOCUMENTS

| | | |
|---|---|---|
| 2006/0156413 A1 | 7/2006 | Oh et al. |
| 2008/0183831 A1 | 7/2008 | Shi et al. |
| 2009/0037493 A1 | 2/2009 | Dang et al. |
| 2009/0151001 A1 | 6/2009 | Li et al. |
| 2011/0091041 A1 | 4/2011 | Zhang et al. |

FOREIGN PATENT DOCUMENTS

| | | | |
|---|---|---|---|
| CN | 1851608 A | | 10/2006 |
| CN | 101038610 A | | 9/2007 |
| CN | 101089865 A | | 12/2007 |
| WO | WO 2004/077911 A2 | | 9/2004 |
| WO | WO 2007-108619 | * | 9/2007 |
| WO | WO 2007/108619 A1 | | 9/2007 |
| WO | WO 2010/003328 A1 | | 1/2010 |

OTHER PUBLICATIONS

Extended European Search Report dated (mailed) Feb. 1, 2012, issued in related Application No. 09793803.9-2212, PCT/CN2009071174, filed Apr. 7, 2009, Huawei Tech Co., Ltd.

Open Mobile Alliance (OMA), "OMA Secure Removable Media Specification", Candidate Version 1.0, OMA-TS-SRM-V1_0-20080128-C; Jan. 28, 2008 (138 pgs.).

First Chinese Office Action mailed Jul. 16, 2012, issued in related Chinese Application No. 200810130556.7 (35 pages).

Notice of Allowance dated Oct. 11, 2012, U.S. Appl. No. 12/980,050, filed Dec. 28, 2010, 18 pages.

* cited by examiner

METHOD AND APPARATUS FOR PROCESSING RIGHTS OBJECT

CROSS-REFERENCE TO RELATED APPLICATIONS

This application is a continuation of U.S. patent application Ser. No. 12/980,050, filed on Dec. 28, 2010, which is a continuation of International Application No. PCT/CN2009/071174, filed on Apr. 7, 2009. The International Application claims priority to Chinese Patent Application No. 200810130556.7, filed on Jul. 7, 2008. The afore-mentioned patent applications are hereby incorporated by reference in their entireties.

FIELD OF THE TECHNOLOGY

The present invention relates to the field of Digital Rights Management (DRM), and more particularly to a method and apparatus for processing a Rights Object (RO).

BACKGROUND OF THE INVENTION

Digital Rights Management (DRM) controls use of digital content, and protects lawful rights and interests of a content owner mainly through a solution of rights limitation and content protection. After a Content Issuer (CI) encrypts the digital content, a user downloads a data packet of the encrypted digital content to a terminal device. A Rights Issuer (RI) is responsible for distributing a Rights Object (RO) corresponding to the digital content, and the RO includes a content decryption key and corresponding rights. Only owning the data packet of the digital content (which includes information necessary for decrypting the digital content) and the RO at the same time, a device is able to normally use the purchased digital content. A DRM Agent gets an RO key by means of decryption with a private key of the device, then gets the digital content decrypted with a content key in the RO, and controls detailed use for the digital content by the user according to rights information in the RO. The RO includes such information as the rights, the limitation, the key, and the digital signature. For the same content, multiple different ROs including different rights can be produced. For example, for a certain document file, browsing rights, printing rights and Move rights of the RO are set in some RO, and only the browsing rights are set in some other RO.

A device owning an RO can independently consume the RO and use the corresponding digital content, and a device without an RO can also consume an RO in a Secure Removable Media (SRM) by interacting with the SRM. The SRM can be a security storage card or a smart card. An RO can be stored on the SRM, so that the RO can be consumed conveniently on multiple devices through the SRM. As with the RO stored on the device, the RO stored on the SRM still needs to be moved out. For example, the user can assign the RO of some old content on the SRM to his/her friends, and purchase an RO of new content for the empty space.

The device moves its own stored RO to the SRM, and also, the device moves the RO from the SRM. In the moving process, the device must check whether "the RO is movable" is noted for the RO itself, that is, checking whether the RO has move rights, and whether the RI allows to move the RO in advance. If the RO stored in the SRM does not have the move rights, or the move rights have been used up, a terminal is incapable of moving the RO out from the SRM. If the user does not fully consider the problems about whether it is needed to move the RO in future, and the times by which it is needed to move the RO during purchasing the RO, it is possible that the RO cannot be moved, which limits the application of the RO.

SUMMARY OF THE INVENTION

The present invention is directed to a method and device for processing a Rights Object (RO), so as to move the RO without Move rights stored on a Secure Removable Media (SRM) out from the SRM, thus extending an application of the RO without the Move rights.

The present invention provides a method for upgrading an RO, which includes the following steps.

A Digital Rights Management (DRM) Agent acquires RO related information of the RO that requires updating from an SRM Agent.

The DRM Agent provides the RO related information to a Rights Issuer (RI), and obtains a new RO from the RI.

The DRM Agent interacts with the SRM Agent to upgrade the RO that requires updating on the SRM by means of the new RO.

The present invention provides another method for upgrading an RO, which includes the following steps.

An RI acquires RO related information of the RO that requires updating on an SRM through a DRM Agent and an SRM Agent.

The RI upgrades the RO that requires updating on the SRM with a newly generated RO.

The present invention provides a method for removing an RO, which includes the following steps.

A DRM Agent receives a trigger message sent by an RI. The trigger message includes an identifier of an RO to be removed on an SRM.

The DRM Agent interacts with an SRM Agent on the SRM to remove the RO to be removed.

The present invention provides a method for moving an RO, which includes the following steps.

An RI acquires RO related information of the RO that requires moving on an SRM through a DRM Agent and an SRM Agent.

The RI triggers the DRM Agent to remove the RO that requires moving on the SRM, and provides to the DRM Agent a Rights Encryption Key (REK) of the RO that requires moving.

The present invention provides another method for moving an RO, which includes the following steps.

A DRM Agent interacts with an SRM Agent to acquire RO related information of the RO that requires moving on an SRM.

The DRM Agent interacts with an RI to provide the RO related information to the RI, and obtain Move rights of the RO that requires moving from the RI.

The DRM Agent moves the RO that requires moving to a device at which the DRM Agent locates according to the Move rights.

The present invention provides an RI, which includes a new RO generating module and a new RO providing module.

The new RO generating module is configured to generate a new RO according to RO related information of an RO that requires updating on an SRM obtained through a DRM Agent and an SRM Agent.

The new RO providing module is configured to provide the new RO to the DRM Agent.

The present invention provides a DRM Agent, which includes an RO related information acquiring module and a first RO upgrading module.

The RO related information acquiring module is configured to obtain RO related information of an RO that requires updating on an SRM from an SRM Agent, and provide the RO related information to an RI.

The first RO upgrading module is configured to upgrade the RO that requires updating on the SRM through the SRM Agent with a new RO generated according to the RO related information by the RI.

The present invention provides another RI, which includes a new RO generating module and a second RO upgrading module.

The new RO generating module is configured to generate a new RO according to RO related information of an RO that requires updating on an SRM obtained through a DRM Agent and an SRM Agent.

The second RO upgrading module is configured to upgrade the RO that requires updating on the SRM with the new RO through the DRM Agent and the SRM Agent.

The present invention provides another DRM Agent, which includes an RO related information acquiring module and a new RO acquiring module.

The RO related information acquiring module is configured to obtain RO related information of an RO that requires updating on an SRM from an SRM Agent, and provide the RO related information to an RI.

The new RO acquiring module is configured to obtain from the RI a new RO generated according to the RO related information.

The present invention provides another DRM Agent, which includes a receiving module and a removing module.

The receiving module is configured to receive a trigger message sent by an RI. The trigger message includes an identifier of an RO to be removed on an SRM.

The removing module is configured to notify an SRM Agent to remove the RO to be removed.

The present invention provides another RI, which includes a triggering module and an REK providing module.

The triggering module is configured to trigger a DRM Agent to remove an RO that requires moving on an SRM through an SRM Agent after acquiring RO related information of the RO that requires moving on the SRM through the DRM Agent and the SRM Agent.

The REK providing module is configured to provide to the DRM Agent an REK of the RO that requires moving.

The present invention provides another DRM Agent, which includes an RO related information acquiring module and an REK acquiring module.

The RO related information acquiring module is configured to obtain RO related information of an RO that requires updating on an SRM from an SRM Agent, and provide the RO related information to an RI.

The REK acquiring module is configured to receive an REK of the RO that requires moving that is provided by the RI.

The present invention provides another RI, which includes a Move rights generating module and a Move rights providing module.

The Move rights generating module is configured to generate Move rights of an RO that requires moving according to RO related information of the RO that requires moving on an SRM acquired through a DRM Agent and an SRM Agent.

The Move rights providing module is configured to provide to the DRM Agent the Move rights of the RO that requires moving.

The present invention provides another DRM Agent, which includes an RO related information acquiring module and an RO moving module.

The RO related information acquiring module is configured to obtain RO related information of an RO that requires updating on an SRM from an SRM Agent, and provide the RO related information to an RI.

The RO moving module is configured to receive Move rights, provided by the RI, of an RO that requires moving, and move the RO that requires moving to a device at which the DRM Agent locates through the SRM Agent according to the Move rights.

It can be known from the technical solution that, according to the embodiments of the present invention, the DRM Agent acquires related information of the RO which is stored on the SRM and does not have the Move rights, and interacts with the RI to move the RO out from the SRM, so as to realize that the RO without the Move rights can be moved out from the SRM, thus extending an application of the RO without the Move rights.

BRIEF DESCRIPTION OF THE DRAWINGS

To make the technical solution under the present invention clearer, the accompanying drawings for illustrating the embodiments of the present invention or the prior art are outlined below. Apparently, the accompanying drawings are for the exemplary purpose only, and person having ordinary skill in the art can derive other drawings from such accompanying drawings without any creative effort.

DETAILED DESCRIPTION OF THE EMBODIMENTS

The technical solution of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

According to the embodiments of the present invention, through a Digital Rights Management (DRM) Agent on a terminal device and a Secure Removable Media (SRM) Agent on an SRM, a Rights Issuer (RI) acquires Rights Object (RO) related information of an RO that requires updating on the SRM, and replaces the RO that requires updating on the SRM with a newly generated RO.

The RO that requires updating may be an RO without Move rights, and accordingly, the new RO can be an RO with the Move rights. Further, according to the embodiments of the present invention, the SRM Agent interacts with the DRM Agent or another DRM Agent, so as to move the new RO with the Move rights to a device at which the DRM Agent locates or a device at which the another DRM Agent locates.

Figure 1:
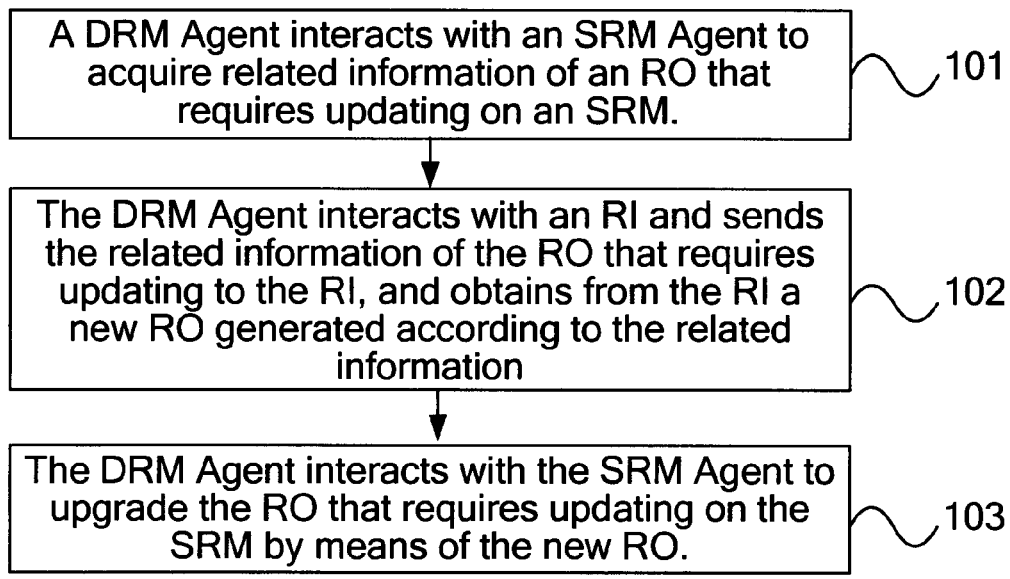
FIG. 1 is a schematic flow chart of a first embodiment of a method for upgrading a Rights Object (RO) according to the present invention.

FIG. 1 is a schematic flow chart of a first embodiment of a method for upgrading an RO according to the present invention. As shown in FIG. 1, the embodiment includes the following steps.

In Step 101, the DRM Agent of the terminal device interacts with the SRM Agent of the SRM, so as to acquire the related information of the RO that requires updating on the SRM.

In Step 102, the DRM Agent interacts with the RI and sends the related information of the RO that requires updating to the RI, and obtains from the RI a new RO generated according to the related information.

In Step 103, the DRM Agent interacts with the SRM Agent to upgrade the RO that requires updating on the SRM by means of the new RO.

In the embodiment, by replacing the RO on the SRM, the SRM is enabled to have a certain type of new operation rights, so as to realize upgrading of the RO, thus extending the application of the RO.

Figure 2:
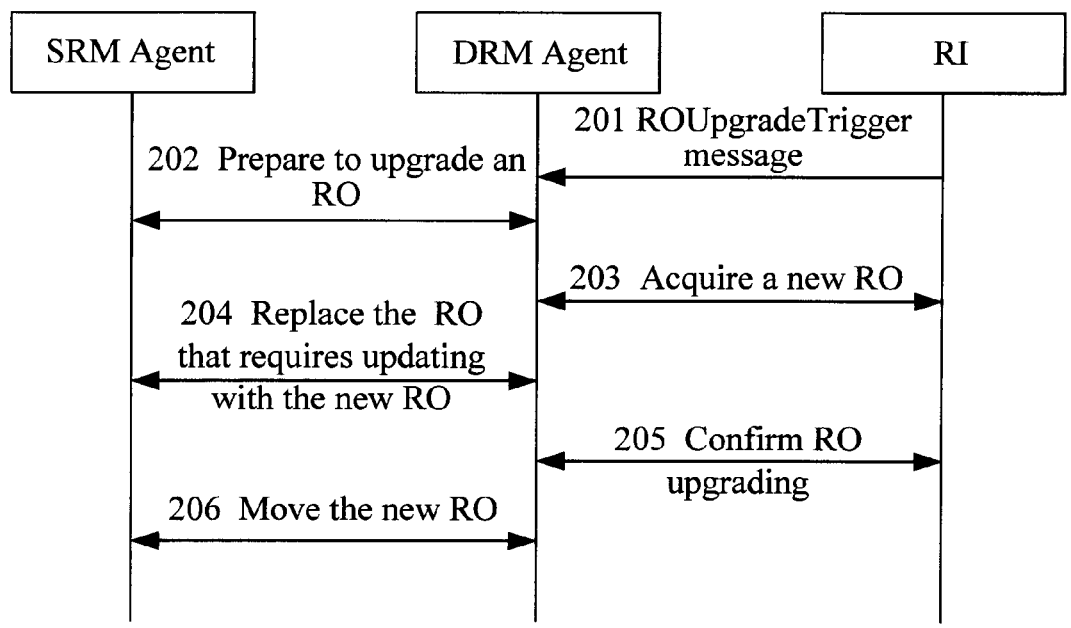
FIG. 2 is a schematic flow chart of a second embodiment of a method for upgrading an RO according to the present invention.

FIG. 2 is a schematic flow chart of a second embodiment of a method for upgrading an RO according to the present invention. A user of a device intends to move the RO issued by the RI and without the Move rights out from the SRM. As shown in FIG. 2, the embodiment includes the following steps.

In Step 201, the RI sends an ROUpgradeTrigger message to the DRM Agent, so as to trigger the DRM Agent to upgrade the RO in the SRM.

Preferably, the ROUpgradeTrigger message may include an identifier of the RO that requires updating, so that when receiving the ROUpgradeTrigger message, the DRM Agent knows which RO is to be upgraded. Before the RI sends the ROUpgradeTrigger message, a terminal user needs to access a web site of the RI in virtue of the device at which the DRM Agent locates or other devices, and submit its own request about upgrading the RO in the SRM and related information of the new RO needed to be supplemented. After performing such operations as an accounting related operation, the RI sends the ROUpgradeTrigger trigger message to the DRM Agent.

The step is an optional step, and the embodiment can also begin directly from Step 202.

Further, the ROUpgradeTrigger message can also include indication information for indicating whether the RI will preserve a Rights Encryption Key (REK) corresponding to the ever issued RO. The REK is used for encrypting a Content Encryption Key (CEK), so as to form the encrypted CEK in the RO.

In Step 202, the DRM Agent interacts with the SRM Agent to prepare to upgrade an RO on the SRM. The preparation work at least includes that the DRM Agent instructs the SRM Agent to set the RO that requires updating to an unavailable status, such that the RO that requires updating is unable to be used for consuming corresponding content by any device.

Preferably, the DRM Agent may obtain an ExistProof indicating that "the RO that requires updating actually exists in the SRM" from the SRM Agent. The Existproof includes partial or all information of the RO that requires updating and a digital signature for the partial or all information of the RO by the SRM Agent. The partial information of the RO mentioned here may be the REK corresponding to the RO or the identifier of the RO. In the following steps, the DRM Agent may send the Existproof to the RI, and the RI verifies the digital signature for the partial or all information of the RO by the SRM included in the ExistProof. If the digital signature is verified to be correct, it is judged that the RO that requires updating exists in the SRM.

Preferably, data of the digital signature performed by SRM in the Existproof can further include a time stamp, so as to prevent the DRM Agent from repetitively using the same ExistProof to get RO from the RI.

Further, if the ROUpgradeTrigger message in the Step 201 includes the indication information which indicates that the RI does not preserve the REK corresponding to the ever issued RO, the SRM Agent should also encrypt the REK with a public key of the RI, and send it to the DRM Agent together with the ExistProof.

In Step 203, the DRM Agent interacts with the RI to acquire the new RO for replacing the RO that requires updating on the SRM. The new RO includes the Move rights. The DRM Agent may send the RO that requires updating, the previous digital signature for the original RO by the RI, and State Information of the RO that requires updating to the RI.

Preferably, the DRM Agent can also send the ExistProof provided by the SRM Agent to the RI, in order to prove to the RI that the RO that requires updating actually exists on the SRM. After the RI verifies that the ExistProof is passed and judges that the RO that requires updating actually exists on the SRM, the new RO is generated to be sent to the DRM Agent. The REK of the new RO is encrypted with a manner in which the DRM Agent is incapable of finally decrypting to obtain, for example, the REK is encrypted firstly with a public key of the SRM, and further encrypted with a public key of the DRM Agent.

Further, if the ROUpgradeTrigger message in the Step 201 includes the indication information which indicates that the RI does not preserve the REK corresponding to the ever issued RO, the DRM Agent should also send to the RI the REK encrypted by the SRM Agent with the public key of the RI, so that the RI verifies the ExistProof provided by the SRM Agent, without exposing the REK to the DRM Agent.

Preferably, the DRM Agent can also send requirements of the terminal user about the new RO to the RI, for example, information of what types of Move rights are needed, such that the RI generates the new RO which satisfies the requirements of the terminal user.

In Step 204, the DRM Agent interacts with the SRM Agent to replace the RO that requires updating on the SRM with the new RO.

The DRM Agent may firstly preprocess the new RO sent by the RI, for example, verifies the digital signature for the new RO by the RI, and requests the SRM Agent to replace the RO that requires updating on the SRM with the new RO acquired from the RI. During the replacement, the SRM needs to decrypt the encrypted REK with its own private key and preserve the decrypted REK.

In Step 205, the DRM Agent interacts with the RI to confirm that replacing the RO has been completed for the RI.

The step is an optional step, and the embodiment can also be executed by directly skipping to Step 206.

In Step 206, the DRM Agent interacts with the SRM Agent to move the new RO on the SRM to the device at which the DRM Agent locates or other devices.

In the embodiment, by firstly upgrading the RO without the Move rights in the SRM, the RO is enabled to have sufficient Move rights, and then the RO is moved, so as to realize separation of upgrading from moving. After the RO is upgraded to have the Move rights, the user can decide which device the RO is to be moved to, such that the RO without the Move rights can be moved out from the SRM, thus extending the application of the RO without the Move rights. If the user intends to move the RO to one connectionless device, that is, a device which is unable to directly communicate with the RI, the embodiment is particularly suitable.

Figure 3:
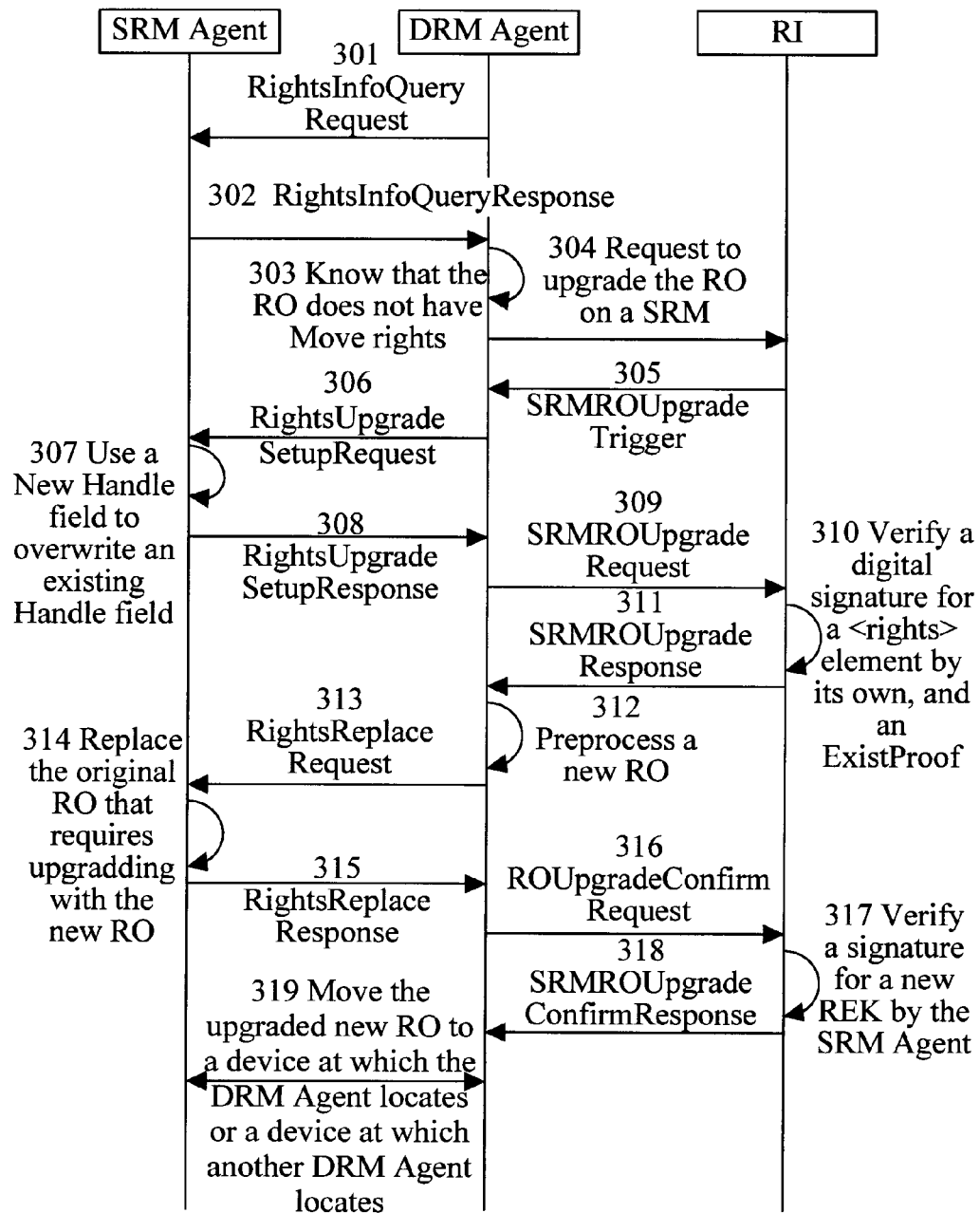
FIG. 3 is a schematic flow chart following interaction protocol reification in the second embodiment of a method for upgrading an RO according to the present invention.

FIG. 3 is a schematic flow chart following interaction protocol reification in a second embodiment of a method for upgrading an RO according to the present invention. Assuming that the RI does not buffer the ever issued REK, as shown in FIG. 3, the detailed process includes the following steps.

In Step 301, the DRM Agent sends a RightsInfoQueryRequest message to the SRM Agent.

In Step 302, after receiving the RightsInfoQueryRequest message, the SRM Agent returns a RightsInfoQueryResponse message to the DRM Agent.

Through the Step 301 and Step 302, the DRM Agent obtains from the SRM all information about the RO that requires updating except for the REK, which includes: a <rights> element, a digital signature for the <rights> element by the RI, Meta Data of RO, and corresponding State Information (if a status RO exists).

The RightsInfoQueryRequest message sent by the DRM Agent in the Step 301 includes fields as shown in Table 1:

TABLE 1

Fields of RightsInfoQueryRequest Message

| Fields | Description |
|---|---|
| Handle | The unique identifier of the RO on the SRM |

The RightsInfoQueryResponse message returned by the SRM Agent in the Step 302 includes fields as shown in Table 2:

TABLE 2

Fields of RightsInfoQueryResponse Message

| Fields | Description |
|---|---|
| Status | A result of processing the RightsInfoQueryRequest message by the SRM Agent. If an error occurs, only this field exists in the RightsInfoQueryResponse message. |
| Rights Meta Data | The Rights Meta Data, which includes information as follows: Rights Object Version RO Alias RI Identifier RI URL RI Alias RI Time Stamp |
| Rights Object Container | Container including the <rights> element and a <signature> element |
| State Information | Remaining State Information of the RO, such as the left times of playing rights. If the RO has no status, the field does not exist. |

In Step 303, after receiving the RightsInfoQueryResponse message, the DRM Agent knows that the RO does not have the Move rights according to the <rights> element and the State Information of the RO.

After receiving the RightsInfoQueryResponse message, the DRM Agent finds that the RO does not have the Move rights by analyzing the <rights> element and the State Information of the RO. The device prompts the user to upgrade the RO in a manner of popping up a dialogue box.

In Step 304, the user logs in the web site provided by the RI through the device at which the DRM Agent locates or other devices, and submits a request for upgrading the RO on the SRM through a page provided by the web site. Preferably, the user can specify through a web page the identifier of the RO that requires updating and the rights that needs to be supplemented.

In Step 305, after such operations as accounting, the RI launches a SRMROUpgradeTrigger message to the DRM Agent. The SRMROUpgradeTrigger message may be used for triggering the DRM Agent to upgrade the RO on the SRM. Fields included in the SRMROUpgradeTrigger message are shown in Table 3:

TABLE 3

Fields of SRMROUpgradeTrigger Message

| Fields | Description |
|---|---|
| ROID | RO Identifier |
| upgradeInfo | Detailed upgrading requirements that the user specifies in a browser, such as, the type of the Move rights that needs to be supplemented, and the times by which the moving is performed |
| REKNeeded | The RI does not buffer the REK corresponding to the ever issued RO, and the DRM Agent is needed to transfer the original text of the REK to the RI, so as to verify the RI. |

In Step 306, after receiving the SRMROUpgradeTrigger message, the DRM Agent sends a RightsUpgradeSetupRequest message to the SRM Agent. The DRM Agent sends the RightsUpgradeSetupRequest message to the SRM Agent in two manners.

In the first manner, according to the upgradeInfo field in the SRMROUpgradeTrigger message, display rights information ever specified to be in need of supplementation by the user to the user, and send the rights information after getting confirmation of the user.

In the second manner, automatically send without the confirmation of the user.

Fields included in the RightsUpgradeSetupRequest message are shown in Table 4:

TABLE 4

Fields of RightsUpgradeSetupRequest Message

| Fields | Description |
| --- | --- |
| Handle | The unique identifier (original identifier) of the RO on the SRM |
| New Handle | The identifier newly allocated for the RO in this upgrading transaction by the DRM Agent, other devices are unable to know the value of the New Handle. |
| REKNeeded | The RI does not buffer the REK corresponding to the ever issued RO, and the SRM Agent is needed to transfer the original text of the REK to the RI, so as to verify the RI. |

In Step 307, after receiving the RightsUpgradeSetupRequest message, the SRM Agent uses the New Handle field to overwrite the existing Handle field.

Before the step 307, the uniqueness of the New Handle field needs to be verified, that is, it should be ensure that other Handle fields do not exist on the SRM. In this way, the unique identifier of the RO on the SRM is only known by the DRM Agent, while other DRM Agents are unable to access the RO because they do not know the corresponding Handle field.

Preferably, the SRM Agent may further set the RO at an unavailable status. Because such fields as Handle of the RO at the unavailable status are not allowed to be queried, it is further ensured that the RO is not accessed by other devices.

The SRMROUpgradeTrigger message sent by the RI includes the REKNeeded field, and thus the DRM Agent also includes the REKNeeded field in the RightsUpgradeSetupRequest message, so as to demonstrate to the SRM Agent that the RI does not buffer the ever issued REK. Therefore, the SRM Agent needs to send the REK in the subsequent steps. If the RI is able to buffer all issued REK, it is unnecessary to transfer the REKNeeded field.

In Step 308, the SRM Agent sends a Rights Upgrade Setup Response message to the DRM Agent.

Fields included in the Rights Upgrade Setup Response message are shown in Table 5:

TABLE 5

Fields of Rights Upgrade Setup Response Message

| Fields | Description |
| --- | --- |
| Status | Indicate whether the SRM Agent successfully processes the RightsUpgradeSetupRequest message. If an error occurs, the response message will only include the field, and the subsequent fields will not be included. |
| ExistProof | Demonstrate that the RO exists on the SRM |
| EncryptedREK | REK encrypted with the public key of the RI, that is, REK bound to the RI |

The ExistProof field is used for proving that the RO that requires updating exists on the SRM, and is an optional field. The ExistProof field includes all information of the RO that requires updating and the digital signature for the all information of the RO that requires updating by the SRM, or includes partial information of the RO that requires updating and the digital signature for the partial information of the RO that requires updating by the SRM. The partial information may be the REK of the RO that requires updating, the identifier of the RO that requires updating, or a combination of the REK of the RO that requires updating and the identifier of the RO that requires updating.

If the REKNeeded field does not exist in the RightsUpgradeSetupRequest message, the EncryptedREK field in the RightsUpgradeSetupResponse message may also be omitted.

In Step 309, after receiving the RightsUpgradeSetupResponse message, the DRM Agent sends a SRM RO Upgrade Request message to the RI.

Fields included in the SRMROUpgradeRequest message are shown in Table 6:

TABLE 6

Fields of SRMROUpgradeRequest Message

| Fields | Description |
| --- | --- |
| ROID | Identifier of the RO that requires updating on the SRM |
| <rights> | <rights> element in the RO that requires updating |
| <signature> | Digital signature for the <rights> element by the RI |
| State Information | State Information corresponding to the RO that requires updating on the SRM |
| ExistProof | Indicate that the RO exists on the SRM |
| EncryptedREK | REK of the RO that requires updating encrypted with the public key of the RI |
| upgradeInfo | Detailed upgrading requirements on the RO for the user |

The ExistProof is used for proving that the RO that requires updating exists on the SRM. The form of the proof is seen in the Step 308.

The EncryptedREK field can be used by the RI to verify whether the device of the terminal user (the device at which the DRM Agent locates or the SRM, but does not know which on earth is it) really owns the RO that requires updating, so that the RI decrypts the encryptedCEK in the <rights> element only by using the REK. If the decryption is successful, it indicates that the device of the terminal user owns the RO that requires updating, and otherwise, the device does not own the RO that requires updating. The EncryptedREK field can also be used by the RI to verify the ExistProof field. When the RI does not preserve its own ever issued REK of the RO that requires updating, the RI needs to decrypt the EncryptedREK to get the original text of the REK, so as to verify the ExistProof.

There can be two cases of the value of the upgradeInfo field in the SRMROUpgradeRequest message: when the DRM Agent performs an RO upgrading operation with the triggering of the SRMROUpgradeTrigger message, the value of the upgradeInfo field is obtained from the value of the field with the same name in the SRMROUpgradeTrigger message; and when the DRM Agent performs the RO upgrading operation without the triggering of the SRMROUpgradeTrigger message, the device needs to display a friendly user interface, for the user to specify the upgrading requirements for the RO, and the value of the upgradeInfo field will be obtained from the user interface.

In Step 310, after receiving the SRMROUpgradeRequest message, the RI verifies the digital signature for the <rights> element by the RI and the ExistProof.

In Step 311, after passing the verification, the RI constructs a new RO according to the upgradeInfo field, and sends the new RO to the DRM Agent through a SRMROUpgradeResponse message.

Preferably, for the purpose of security, the REK in the new RO is different from the REK in the original RO that requires updating.

Fields included in the SRMROUpgradeResponse message are shown in Table 7:

TABLE 7

Fields of SRMROUpgradeResponse Message

| Fields | Description |
| --- | --- |
| Status | Indicate whether the RI has successfully processed the SRMROUpgradeRequest message. If an error occurs, subsequent fields of the message will not exist. |
| New RO | New RO under protection and satisfying the user requirements. The New RO includes the digital signature for the <rights> element by the RI, and its REK is firstly encrypted with the public key of the SRM Agent and then encrypted with the public key of the DRM Agent. |

The REK in the new RO should be different from the REK of the RO that requires updating, and its encrypting algorithm is described as follows.

After the RI randomly generates the REK, it is needed to execute the following steps for delivering the REK to the SRM in a case that the DRM Agent is unable to know.

A random number $Z_x$ is generated, so as to get:

$KEK_x = KDF(I2OSP(Z_x, mLen_{SRM}), NULL, kekLen)$ where $mLen_{the\ SRM}$ is a modulus length of an SRM certificate, and the kekLen and the KDF( ) function can refer to the OMA DRM standard manuscript OMA-TS-DRM_DRM-V2_1-20070919-C.doc;

so as to get:

$C_{x2} = AES\text{-}WRAP(KEK_x, REK)$; and $C_{x1} = I2OSP(RSA.ENCRYPT(PubKey_{SRM}, Z_x), mLen_{SRM})$;

in which, the I2OSP( ) function and the RSA.ENCRYPT( ) function can refer to the DRM standard manuscript;

and so as to get:

$EncREK = C_{x1} | C_{x2}$.

A random number Z and a $K_{MAC}$ are then generated (according to the DRM standard, which is used for the DRM Agent to verify the message integrity), so as to get:

$KEK = KDF(I2OSP(Z, mLen_{DRMAgent}), NULL, kekLen)$;

in which, $mLen_{DRMAgent}$ is a modulus length of a DRM certificate, and the kekLen and the KDF( ) function can refer to the DRM standard manuscript;

and so as to get by the previously got EncREK and $K_{MAC}$:

$K = K_{MAC} | EncREK$;

$C_2 = AES\text{-}WRAP(KEK, K)$;

$C_1 = I2OSP(RSA.ENCRYPT(PubKey_{DRMAgent}, Z), mLen_{DRMAgent})$; and $C = C_1 | C_2$.

The RI carries the C in the new RO and sends the new RO to the DRM Agent. After receiving the C, the DRM Agent can finally get the EncREK by means of its own private key, and transfer the EncREK to the SRM Agent. The SRM Agent can finally get the REK by means of its own private key.

In Step 312, after receiving the new RO satisfying the user requirements, the DRM Agent preprocesses the new RO. The preprocessing includes the following steps.

Verify the digital signature for the SRMROUpgradeResponse message by the RI.

Verify the digital signature for the <rights> element by the RI.

Extract from the SRMROUpgradeResponse message the Rights Meta Data, the <rights> element, the <signature> element, that is, the digital signature for the <rights> element by the RI defined by the OMA SRM 1.0 standard.

Extract the EncryptedREK field, that is, a result of encrypting the REK by the RI with the public key of the SRM Agent from the SRMROUpgradeResponse message.

If appropriately reducing the security requirements, the REK of the new RO can also not be further encrypted with the public key of the SRM Agent.

In Step 313, after completing the preprocessing, the DRM Agent sends a RightsReplaceRequest message to the SRM Agent.

Fields included in the RightsReplaceRequest message are shown in Table 8:

TABLE 8

Fields of RightsReplaceRequest Message

| Fields | Description |
| --- | --- |
| Handle | Current identifier of the RO in the SRM, its value is the New Handle in the RightsUpgradeSetupRequest message. |
| Size | Size of the new RO |
| Rights Information | Extracted from the SRMROUpgradeResponse message, and including the Rights Meta Data and the RO Container |
| EncryptedREK | REK encrypted with the public key of the SRM |

In Step 314, after receiving the RightsReplaceRequest message, the SRM Agent replaces the RO that requires updating with the new RO.

Replacing with the new RO by the SRM Agent can adopt two following manners.

In the first manner, a new storage slot for storing the new RO is newly created according to the size field, which has a corresponding handle field being a temporary handle, the new RO is stored into the new storage slot, the existing original storage slot (that is, the storage slot corresponding to the value of the handle field in the RightsReplaceRequest message) is removed, and the temporary handle is overwritten with the value corresponding to the handle field in the RightsReplaceRequest message.

In the second manner, firstly, the existing original storage slot (that is, the storage slot corresponding to the value of the handle field in the RightsReplaceRequest message) is removed, a new storage slot is created according to the size field, which has a value of the corresponding handle being the value of the handle field in the RightsReplaceRequest message, and the new RO is stored into the new storage slot.

In the process of storing the new RO into the new storage slot in the two manners, if the REK in the SRMROUpgradeResponse is further encrypted with the public key of the SRM Agent, it is different from the OMA SRM 1.0 standard in that, before storing the REK, the SRM Agent needs to decrypt the EncryptedREK field with its own private key, and then store the result after decrypting into the storage slot. Otherwise, the SRM Agent directly stores the REK without a decryption process.

In Step 315, the SRM Agent returns a RightsReplaceResponse message to the DRM Agent.

Fields included in the RightsReplaceResponse message are shown in Table 9:

TABLE 9

Fields of RightsReplaceResponse Message

| Fields | Description |
| --- | --- |
| Status | Indicate whether the SRM Agent has successfully processed the RightsReplaceRequest message. If an error occurs, subsequent fields of the message will not exist. |
| ReplaceProof | Proof for demonstrating that the new RO has replaced the existing RO that requires updating in the SRM |

The ReplaceProof field is used for proving that the new RO has replaced the existing RO that requires updating on the SRM, and is an optional field. The proof includes the following information and the digital signature for it by the SRM:

{
    the identifier of the DRM Agent which urges the SRM Agent to perform the upgrading operation;
        upgrading time;
        the identifier representing the replacing operation;
        the REK of the new RO and/or the identifier of the new RO; and
        the REK of the old RO (that is, the REK of the RO that requires updating) and/or the identifier of the old RO (that is, the identifier of the RO that requires updating)
}

In Step 316, after receiving the RightsReplaceResponse message, the DRM Agent sends a SRM RO Upgrade Confirm Request message to the RI, so as to confirm for the RI that the new RO has successfully replaced the original RO on the SRM.

Fields included in the SRMROUpgradeConfirmRequest message are shown in Table 10:

TABLE 10

Fields of SRMROUpgradeConfirmRequest Message

| Fields | Description |
| --- | --- |
| Status | Indicate whether the RO has been successfully upgraded |
| ReplaceProof | Proof for demonstrating that the new RO has replaced the existing RO that requires updating in the SRM |

The ReplaceProof field is used for proving that the new RO has replaced the existing RO that requires updating on the SRM, and is an optional field. The form of the proof is seen in the Step 315.

In the Steps 314 to 316, replacing of the old RO with the new RO is realized through a pair of messages. The inventor considers that it can also be realized through two pairs of messages. That is to say, the DRM Agent sends the messages to the SRM Agent and requires the SRM Agent to remove the RO that requires updating; and after confirming that the RO that requires updating has been removed, the DRM Agent sends the messages to the SRM Agent to transfer the new RO to the SRM Agent, and the SRM Agent installs the new RO into the SRM. However, in this way, the DRM Agent obtains a RemovalProof of the RO that requires updating and an InstallationProof of the new RO successively from the SRM Agent. The RemovalProof includes the following information and the digital signature for it by the SRM:

{
    the identifier of the DRM Agent which urges the SRM Agent to perform a removing operation;
        removing time;
        the identifier representing the removing operation;
        the REK of the removed RO; (that is, the REK of the RO that requires updating) and the identifier of the removed RO; (that is, the identifier of the RO that requires updating)
}

Moreover, the InstallationProof includes the following information and the digital signature for it by the SRM:

{
    the identifier of the DRM Agent which urges the SRM Agent to perform an installation operation;
        installation time;
        the identifier representing the installation operation;
        the REK of the installed RO; (that is, the REK of the new RO) and the identifier of the installed RO; (that is, the identifier of the new RO)
}

In Step 317, after receiving the SRMROUpgradeConfirmRequest message, the RI verifies the ReplaceProof or the RemovalProof and the InstallationProof provided by the SRM Agent.

In Step 318, after passing the verification, the RI returns a SRMROUpgradeConfirmResponse message to the DRM Agent.

Fields included in the SRMROUpgradeConfirmResponse message are shown in Table 11:

TABLE 11

Fields of SRMROUpgradeConfirmResponse Message

| Fields | Description |
| --- | --- |
| Status | Indicate whether the RI has successfully processed the SRMROUpgradeConfirmRequest message |

After executing the step, the RO not having the Move rights on the SRM currently has been replaced by the RO having the Move rights.

In Step 319, after receiving the SRMROUpgradeConfirmResponse message, the DRM Agent can move the upgraded new RO to the device at which the DRM Agent locates with a Push Move protocol of the OMA SRM 1.0 immediately or at a certain moment in future.

If the user is unwilling to move the RO to the device which the DRM agent locates at, while intends to move the RO to another device, the user can insert the SRM to the another device, and then perform a Pull Move operation.

Alternatively, besides the disclosed realization methods, some alternative methods for the steps in the embodiment also exist, which are described in the following for example.

The obtaining, by the DRM Agent, the new RO from the RI can also be realized without using the method of adding new messages, that is, the SRMROUpgradeRequest message and the SRMROUpgradeResponse message on the existing OMA SRM 1.0 standard as in the Step 309 and the Step 310, instead, the same effect can be achieved by modifying a message in an existing ROAP-ROUpgrade Protocol, and delivering a field or data needed to be delivered by means of an Extension field in the message.

The replacing the original RO on the SRM with the new RO by the DRM Agent can also be realized without using the method of adding new messages, that is, the RightsReplaceRequest message and the RightsReplaceResponse message on the existing OMA SRM 1.0 standard as in the Step 313 and the Step 315, instead, it is realized with two pairs of messages. Particularly, firstly the new RO is installed, that is, the RightsInstallRequest message and the RightsInstallResponse message are used, and then the existing original RO is removed, that is, the RightsRemovalRequest message and the RightsRemovalResponse message are used. However, the installing the new RO is somewhat different from the installation method in the existing OMA SRM 1.0 standard, that is, the SRM Agent needs to preserve the EncryptedREK field after decrypting it with the private key of the SRM Agent, while in the OMA SRM 1.0 standard, the DRM Agent transfers to the SRM Agent the REK which can be directly stored, rather than the REK encrypted with the public key of the SRM Agent.

Figure 4:
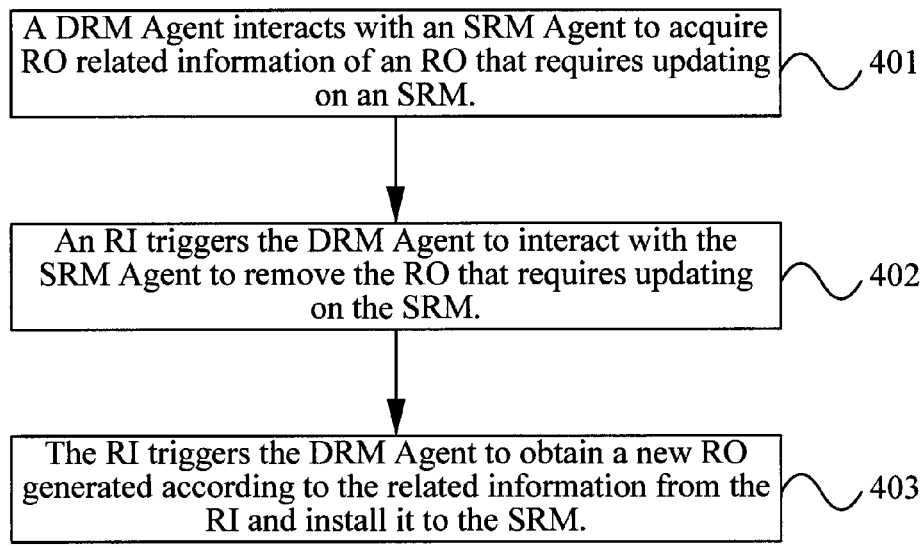
FIG. 4 is a schematic flow chart of a first embodiment of another method for upgrading an RO according to the present invention.

FIG. 4 is a schematic flow chart of a first embodiment of another method for upgrading an RO according to the present invention. As shown in FIG. 4, the embodiment includes the following steps.

In Step 401, the DRM Agent interacts with the SRM Agent to acquire the RO related information of the RO that requires updating on the SRM.

In Step 402, the RI triggers the DRM Agent to interact with the SRM Agent to remove the RO that requires updating on the SRM.

In Step 403, the RI triggers the DRM Agent to obtain the new RO generated according to the related information from the RI, and install the new RO to the SRM.

In this embodiment, by removing the RO on the SRM and replacing the RO with the new RO, the SRM is enabled to have a certain type of the new operation rights, so as to realize the upgrading of the RO, thus extending the application of the RO.

Figure 5:
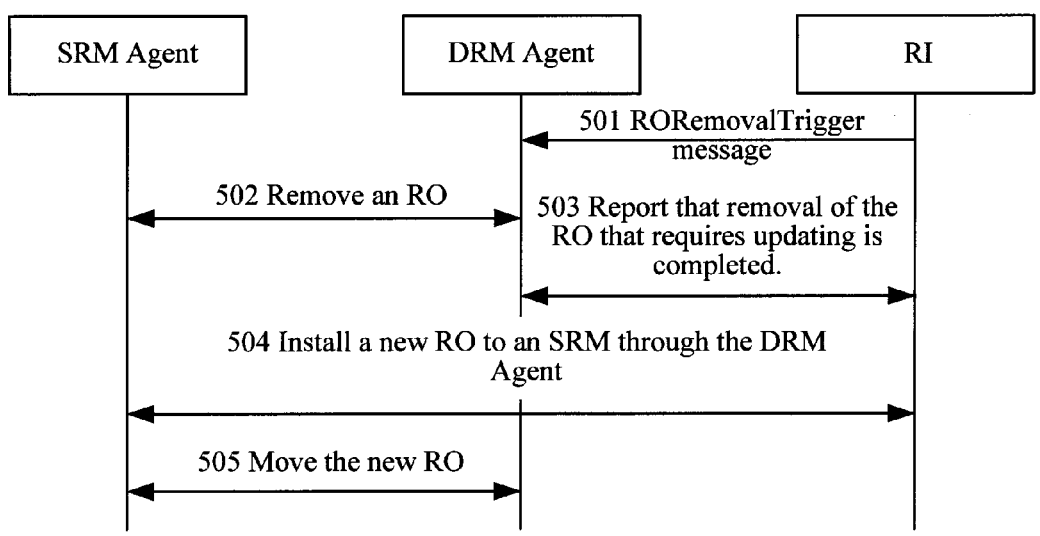
FIG. 5 is a schematic flow chart of a second embodiment of another method for upgrading an RO according to the present invention.

FIG. 5 is a schematic flow chart of a second embodiment of another method for upgrading an RO according to the present invention. An RO issued by the RI and not having the Move rights exists on the SRM, and a user of a device intends to move the RO to the device. As shown in FIG. 5, the embodiment includes the following steps.

In Step 501, the RI sends a RORemovalTrigger message to the DRM Agent, so as to trigger the DRM Agent to remove the RO on the SRM.

Preferably, the RORemovalTrigger message can include the identifier of the original RO to be removed, so that when receiving the RORemovalTrigger message, the DRM Agent knows which RO is to be removed. Before the RI sends the RORemovalTrigger message, the terminal user needs to access the web site of the RI in virtue of the device at which the DRM Agent locates or the other devices, and submit a request about intending to move the RO in the SRM to the device and the related information of the new RO needed to be supplemented. After performing such operations as the accounting related operation, the RI can send the RORemovalTrigger message to the DRM Agent.

The step is an optional step, and the embodiment can also begin directly from Step 502.

In Step 502, the DRM Agent interacts with the SRM Agent to remove the RO on the SRM.

Preferably, the DRM Agent can obtain the RemovalProof indicating that "the RO has been removed by the SRM Agent" from the SRM Agent. The form of the proof is seen in the illustration of the Step 316.

In Step 503, the DRM Agent interacts with the RI to report to the RI that removal of the RO that requires updating is completed.

Preferably, for the purpose of security, the DRM Agent should provide the RemovalProof in the Step 502 to the RI. After verifying that the ExistProof is passed, the RI can judge that the RO that requires updating has been removed from the SRM, and send the new RO to the DRM Agent.

In Step 504, the RI installs a new RO including the existing rights in the RO that requires updating together with the Move rights needed by the user to the SRM through the DRM Agent.

In Step 505, the DRM Agent interacts with the SRM Agent to move the new RO on the SRM to the device at which the DRM Agent locates. Alternatively, another DRM Agent interacts with the SRM Agent to move the new RO on the SRM to the device at which the another DRM Agent locates.

This embodiment is similar to an embodiment of a method for upgrading RO rights of the present invention. By firstly upgrading the RO without the Move rights in the SRM, the RO is enabled to have sufficient Move rights, and then the RO is moved, so as to realize the separation of the upgrading from the moving. After the RO is upgraded to have the Move rights, the RO is moved to the device at which the DRM Agent locates, so as to move the RO without the Move rights out from the SRM, thus extending the application of the RO without the Move rights. However, the upgrading method in the embodiment is different, that is, the RI triggers the DRM Agent to remove the RO on the SRM, and then installs the new RO to the SRM through the DRM Agent.

Figure 6:
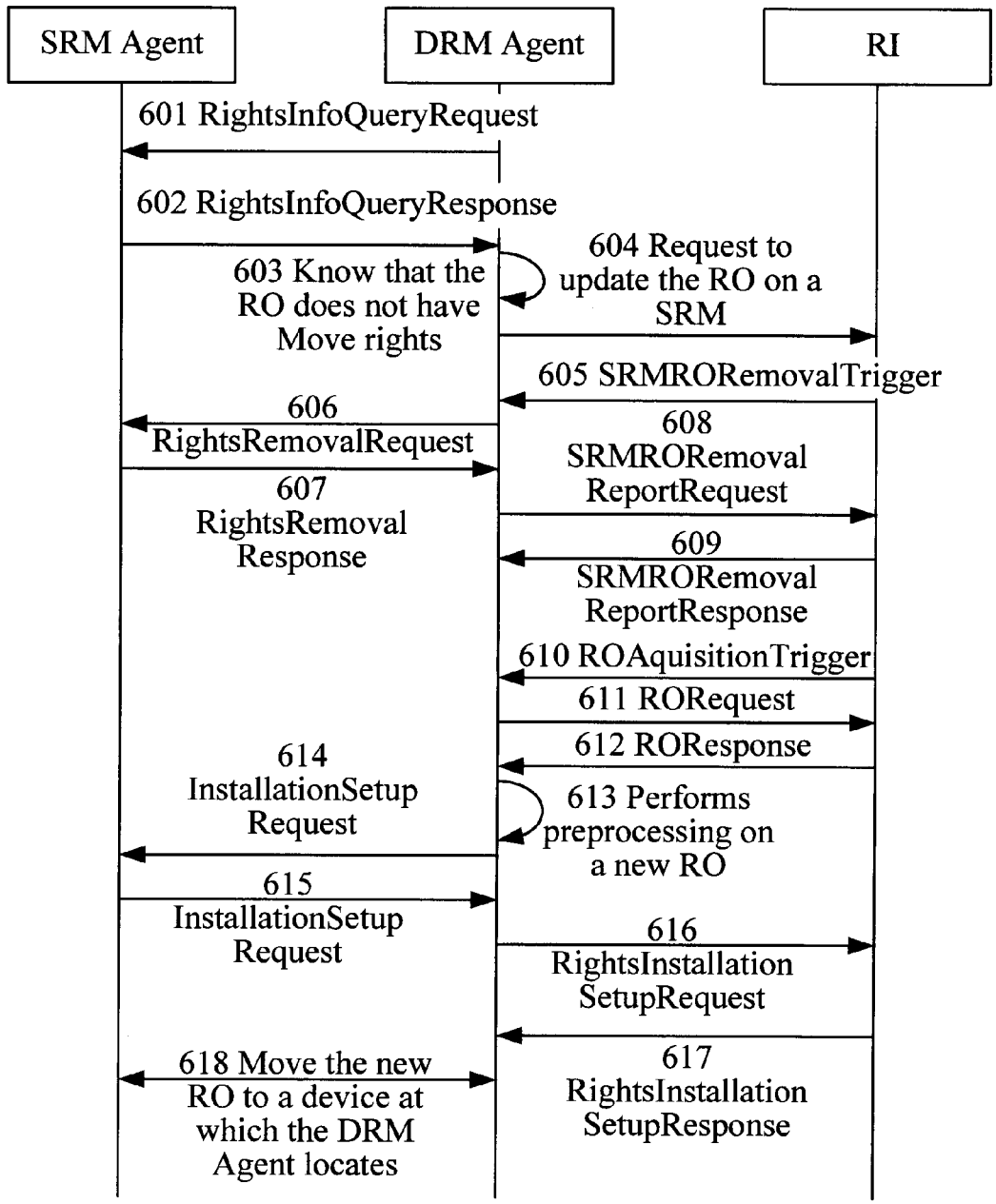
FIG. 6 is a schematic flow chart following interaction protocol reification in the second embodiment of another method for upgrading an RO according to the present invention.

FIG. 6 is a schematic flow chart following interaction protocol reification in a second embodiment of another method for upgrading an RO according to the present invention. As shown in FIG. 6, the detailed process includes the following steps.

In Step 601, the DRM Agent sends the RightsInfoQueryRequest message to the SRM Agent. The RightsInfoQueryRequest message includes the Handle field.

In Step 602, after receiving the RightsInfoQueryRequest message, the SRM Agent returns the RightsInfoQueryResponse message to the DRM Agent. The RightsInfoQueryResponse message includes the Rights Meta Data field, the Rights Object Container field, and the State Information field.

Through the Step 601 and Step 602, from the SRM, the DRM Agent obtains all information about the RO to be removed except for the REK, which includes: the <rights> element, the signature for the <rights> element by the RI, the Rights Meta Data, and the corresponding State Information (If the RO has the status RO).

In Step 603, after receiving the RightsInfoQueryResponse message, the DRM Agent can know that the RO does not have the Move rights according to the <rights> element and the State Information of the RO.

After receiving the RightsInfoQueryResponse message, the DRM Agent can find that the RO does not have the Move rights by analyzing the <rights> element and the State Information of the RO. The device can prompt the user to upgrade the RO in the manner of popping up a dialogue box.

In Step 604, the user logs in the web site provided by the RI through the device at which the DRM Agent locates or the other devices, and submits the request about upgrading the RO on the SRM through the page provided by the web site. Preferably, the user can specify the identifier of the RO that requires updating and the rights that needs to be supplemented through the web page.

In Step 605, after such operations as the accounting, the RI sends a SRMRORemovalTrigger message to the DRM Agent. The SRMRORemovalTrigger message can be used for triggering the DRM Agent to remove the RO on the SRM. The SRMRORemovalTrigger message includes the ROD field and the REKNeeded field.

Preferably, the SRMRORemovalTrigger message may also include the reason of the RO removal or a hyperlink for designating the reason of the removal. In this way, after the DRM Agent receives the SRMRORemovalTrigger message, the device at which the DRM Agent locates can display to the terminal user the reason of the removal, such as, the user has submitted the requirements for upgrading the RO through a web page before.

In Step 606, after receiving the SRMRORemovalTrigger message, the DRM Agent sends a RightsRemovalRequest message to the SRM Agent. The RightsRemovalRequest message includes the Handle field and the ProofNeeded field.

In Step 607, the SRM Agent sends a RightsRemovalResponse message to the DRM Agent. The RightsRemovalResponse message includes the Status field and the Proof of Removal field.

In Step 608, after receiving the RightsRemovalResponse message, the DRM Agent sends a SRMRORemovalReportRequest message to the RI. The SRMRORemovalReportRequest message includes the ROID field, the <rights> element, the <signature> element, and the Proof of Removal field.

In Step 609, after receiving the SRMRORemovalReportRequest message, the RI returns a SRMRORemovalReportResponse message to the DRM Agent.

In Step 610, the RI sends a ROAquisitionTrigger message to the DRM Agent. The ROAquisitionTrigger message includes the ROID field.

In Step 611, the DRM Agent sends a RORequest message to the RI, so as to acquire the new RO having the Move rights. The RORequest message includes the ROID field.

In Step 612, after receiving the RORequest message, the RI provides a new RO bound to the SRM Agent to the SRM through the DRM Agent by returning a ROResponse message to the DRM Agent.

In Step 613, after receiving the new RO, the DRM Agent performs preprocessing on the new RO. The preprocessing includes such steps as verifying the integrity of the RO.

In Step 614, after completing the preprocessing, the DRM Agent sends an InstallationSetupRequest message to the SRM Agent. The InstallationSetupRequest message includes the Handle field and the Size field.

In Step 615, after receiving the InstallationSetupRequest message, the SRM Agent returns an InstallationSetupResponse message to the DRM Agent. The InstallationSetupResponse message includes the Status field.

In Step 616, after receiving the InstallationSetupResponse message, the DRM Agent sends a RightslnstallationSetupRequest message to the SRM Agent. The RightsInstallationSetupRequest message includes the Handle field, the Rights Information field, and an REK bound to SRM Agent field.

In Step 617, after receiving the RightsInstallRequest message, the SRM Agent returns a RightslnstallationSetupResponse message to the DRM Agent. The RightslnstallationSetupResponse message includes the Status field.

So far, the RO originally not having the Move rights on the SRM becomes the RO having the Move rights.

In Step 618, the DRM Agent interacts with the SRM Agent to move the new RO out from the SRM. After receiving the RightslnstallationSetupResponse message, the DRM Agent can move the upgraded new RO to the device at which the DRM Agent locates immediately or at a certain moment in future.

Figure 7:
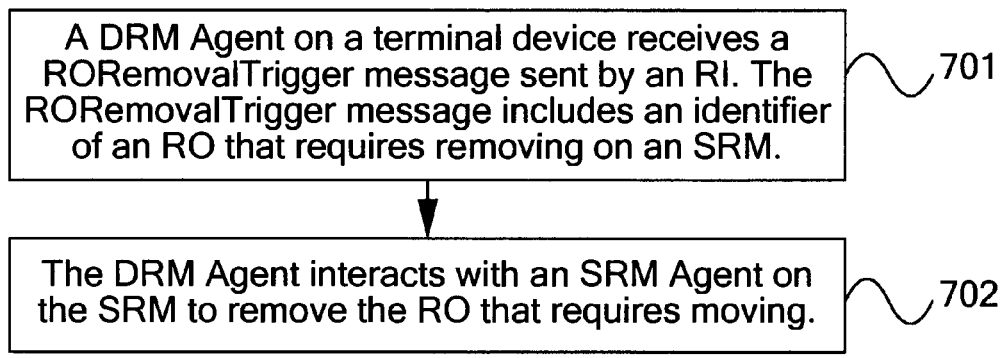
FIG. 7 is a schematic flow chart of an embodiment of a method for removing an RO according to the present invention.

FIG. 7 is a schematic flow chart of an embodiment of a method for removing an RO according to the present invention. As shown in FIG. 7, the embodiment includes the following steps.

In Step 701, the DRM Agent on the terminal device receives a RORemovalTrigger message sent by the RI. The RORemovalTrigger message includes the identifier of the RO to be removed on the SRM.

In Step 702, the DRM Agent interacts with the SRM Agent on the SRM to remove the RO to be removed.

In this embodiment, according to the identifier of the RO to be removed on the SRM included in the received RORemovalTrigger message, the DRM Agent interacts with the SRM Agent on the SRM to remove the RO to be removed, so that the RO on the SRM can be removed, and the new RO is installed after acquiring the REK of the RO provided by the RI, thus extending the application of the RO.

Figure 8:
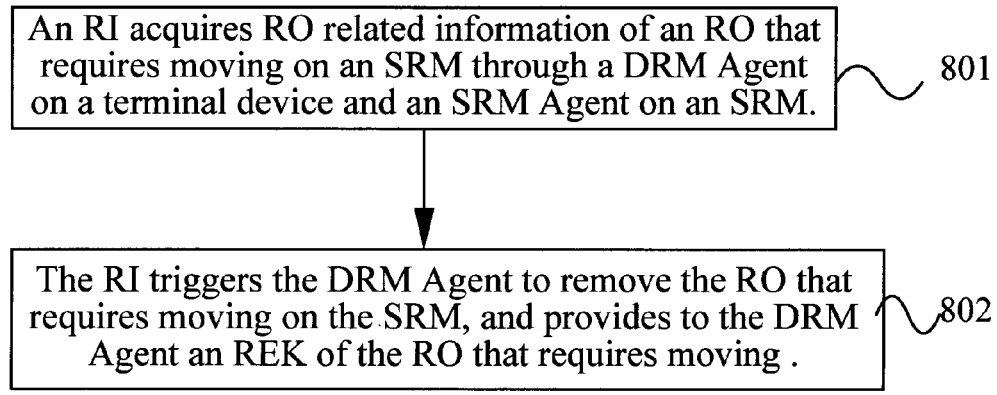
FIG. 8 is a schematic flow chart of a first embodiment of a method for moving an RO according to the present invention.

FIG. 8 is a schematic flow chart of a first embodiment of a method for moving an RO according to the present invention. As shown in FIG. 8, the embodiment includes the following steps.

In Step 801, the RI acquires the RO related information of the RO that requires moving on the SRM through the DRM Agent on the terminal device and the SRM Agent on the SRM.

In Step 802, the RI triggers the DRM Agent to remove the RO that requires moving on the SRM, and provides to the DRM Agent the REK of the RO that requires moving.

In this embodiment, after acquiring the RO related information of the RO that requires moving on the SRM, the RI triggers the DRM Agent to remove the RO that requires moving, and provides to the DRM Agent the REK of the RO that requires moving, for the DRM Agent to install the new RO to the SRM according to the related information and the REK, so as to move the RO without the Move rights out from the SRM, thus extending the application of the RO.

Figure 9:
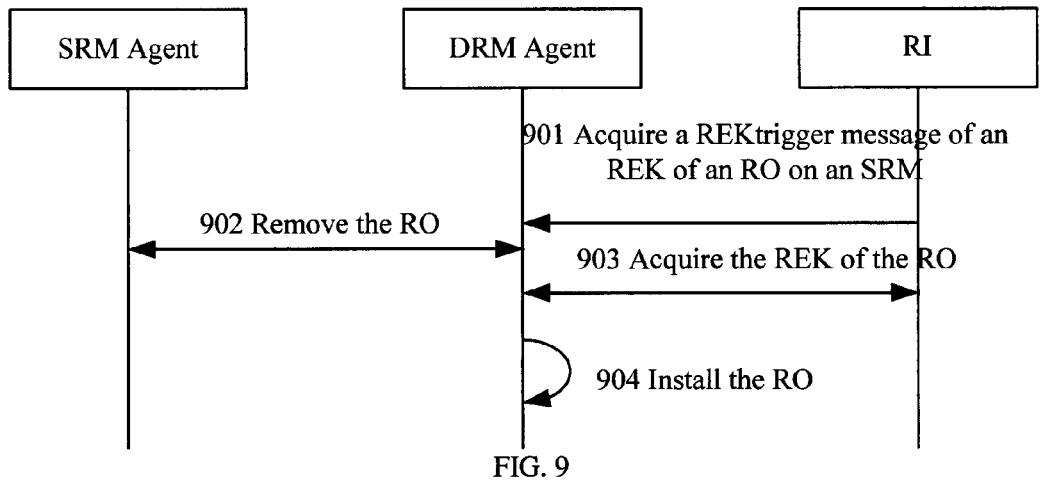
FIG. 9 is a schematic flow chart of a second embodiment of a method for moving an RO according to the present invention.

FIG. 9 is a schematic flow chart of a second embodiment of a method for moving an RO according to the present invention. Assuming that the RI buffers the ever issued REK, an RO issued by the RI and not having the Move rights exists on the SRM, and the user of the device intends to move the RO to the device. As shown in FIG. 9, the embodiment includes the following steps.

In Step 901, the RI sends a REKtrigger message to the DRM Agent, so as to trigger the DRM Agent to acquire the REK corresponding to an RO from the RI.

Preferably, the REKtrigger message can include the identifier of the RO, so that when receiving the REKtrigger message, the DRM Agent knows that the corresponding REK of which RO is to be acquired. Before the RI sends the REKtrigger message, the terminal user needs to access the web site of the RI in virtue of the device at which the DRM Agent locates or the other devices, and submit the request about intending to move the RO in the SRM to its own. After performing such operations as the accounting related operation, the RI can send the REKtrigger message to the DRM Agent.

The step is an optional step, and the embodiment can also begin directly from Step 902.

In Step 902, the DRM Agent interacts with the SRM Agent to remove the RO on the SRM.

Preferably, the DRM Agent may obtain an Existproof indicating that "the RO exists on the SRM and the RO has been removed by the SRM Agent" from the SRM Agent. The form of the proof can be a signature for the REK corresponding to the RO by the SRM Agent and a signature for a request message of RO removal sent by the DRM Agent.

Preferably, the proof may also include a time stamp, so as to prevent the DRM Agent from repetitively using this Exist-Proof to get RO from the RI. That is to say, the signature range of the SRM Agent can include a time stamp.

In Step 903, the DRM Agent interacts with the RI to acquire the REK corresponding to the RO.

Preferably, for the purpose of security, the DRM Agent should provide a proof indicating that "the corresponding RO actually exists on the SRM and the RO has been removed by the SRM Agent" to the RI. After verifying the proof, the RI sends the REK bound to the DRM Agent (that is, the REK encrypted with the public key of the DRM Agent) to the DRM Agent. This REK should be the same as the REK previously stored in the SRM.

In Step 904, the DRM Agent installs the RO according to the related information of the RO and the REK of the RO.

In this embodiment, after acquiring from the SRM Agent the related information of the RO, that is, the information except for the REK, the DRM Agent removes the RO on the SRM, then acquires the REK from the RI, and installs the RO according to the acquired RO related information and REK, so that the RO without the Move rights can be moved from the SRM to the device at which the DRM Agent locates, thus extending the application of the RO without the Move rights.

Figure 10:
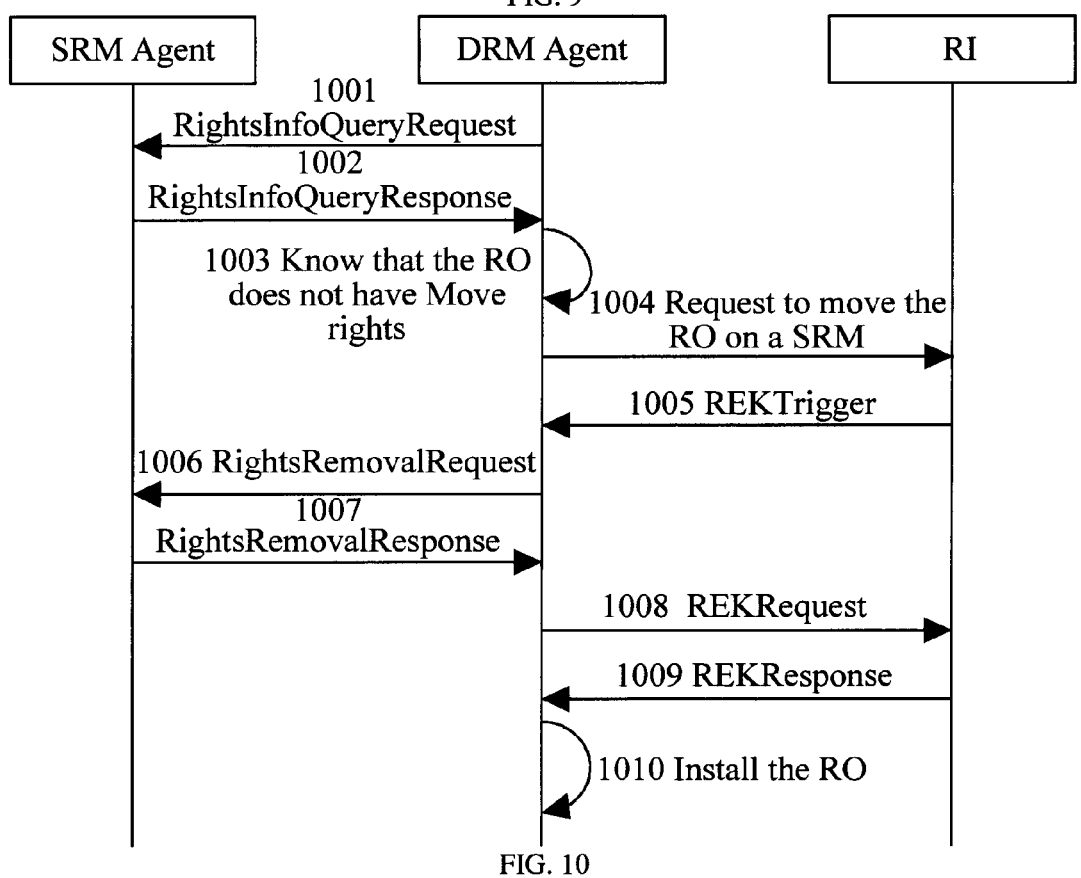
FIG. 10 is a schematic flow chart following interaction protocol reification in the second embodiment of a method for moving an RO according to the present invention.

FIG. 10 is a schematic flow chart following interaction protocol reification in the second embodiment of a method for moving an RO according to the present invention. As shown in FIG. 10, the detailed process includes the following steps.

In Step 1001, the DRM Agent sends the RightsInfoQueryRequest message to the SRM Agent.

In Step 1002, after receiving the RightsInfoQueryRequest message, the SRM Agent returns the RightsInfoQueryResponse message to the DRM Agent.

Through the Step 1001 and Step 1002, the DRM Agent obtains from the SRM all information about the RO to be removed except for the REK, which includes: the <rights> element, the signature for the <rights> element by the RI, the Rights Meta Data, and the corresponding State Information (If the RO has the status RO).

The RightsInfoQueryRequest message sent by the DRM Agent in the Step 1001 includes fields as shown in Table 12:

TABLE 12

Fields of RightsInfoQueryRequest Message

| Fields | Description |
|---|---|
| Handle | The unique identifier of the RO on the SRM |

The RightsInfoQueryResponse message returned by the SRM Agent in the Step 1002 includes fields as shown in Table 13:

TABLE 13

Fields ofs RightsInfoQueryResponse Message

| Fields | Description |
|---|---|
| Status | A result of processing the RightsInfoQueryRequest message by the SRM Agent. If an error occurs, only this field will be present in the RightsInfoQueryResponse message. |
| Rights Meta Data | The Rights Meta Data, which includes information as follows: Rights Object Version RO Alias RI Identifier RI URL RI Alias RI Time Stamp |
| RO Container | Container including the <rights> element and the <signature> element |
| State Information | Remaining State Information of the RO, such as the left times of playing rights. If the RO has no status, the field is not present. |

In Step 1003, after receiving the RightsInfoQueryResponse message, the DRM Agent can know that the RO does not have the Move rights according to the <rights> element and the State Information of the RO.

After receiving the RightsInfoQueryResponse message, the DRM Agent may find that the RO does not have the Move rights by analyzing the <rights> element and the State Information of the RO. The device can prompt the user to remove the RO in the manner of popping up a dialogue box.

In Step 1004, the user logs in the web site provided by the RI through the device at which the DRM Agent locates or the other devices, and submits a request about moving the RO on the SRM through the page provided by the web site. Preferably, the user can specify the identifier of the RO needed to be moved through the web page.

In Step 1005, after such operations as accounting, the RI sends a REKTrigger message to the DRM Agent. The REKTrigger message may be used for triggering the DRM Agent to acquire the REK corresponding to the RO from the RI. Fields included in the REKTrigger message are shown in Table 14:

TABLE 14

Fields of REKTrigger Message

| Fields | Description |
|---|---|
| ROID | RO Identifier |

In Step 1006, after receiving the REKTrigger message, the DRM Agent sends a RightsRemovalRequest message to the SRM Agent.

Fields included in the RightsRemovalRequest message are shown in Table 15:

TABLE 15

Fields of RightsRemovalRequest Message

| Fields | Description |
|---|---|
| Handle | RO whose identifier needs to be removed |
| RemovalProofNeeded | Demonstrate whether the DRM Agent needs the SRM Agent to return a proof indicating that the RO has been removed |

In Step 1007, after receiving the RightsRemovalRequest message, the SRM Agent returns a RightsRemovalResponse message to the DRM Agent.

Fields included in the RightsRemovalResponse message are shown in Table 16:

TABLE 16

Fields of RightsRemovalResponse Message

| Fields | Description |
| --- | --- |
| Status | Indicate whether the SRM Agent successfully processes the RightsRemovalRequest message |
| RemovalProof | Proof indicating that the RO has been removed on the SRM |

The RemovalProof field is used for proving that RO has been removed from the SRM. The proof includes a signature for the following information combination by the SRM:

{
   the identifier of the DRM Agent which urges the SRM Agent to perform the removing operation;
   the removing time;
   the identifier representing the removing operation;
   the REK of the removed RO; and
   the identifier of the removed RO;
}.

In Step 1008, after receiving the RightsRemovalResponse message, the DRM Agent sends a REKRequest message to the RI.

Fields included in the REKRequest message are shown in Table 17:

TABLE 17

Fields of REKRequest Message

| Fields | Description |
| --- | --- |
| ROID | RO Identifier |
| <rights> | Corresponding <rights> element in the RO |
| <signature> | The signature for the <rights> element by the RI |
| RemovalProof | Proof of the SRM Agent indicating that the RO has been removed |

In Step 1009, after receiving the REKRequest message, the RI returns a REKResponse message to the DRM Agent.

Fields included in the REKResponse message are shown in Table 18:

TABLE 18

Fields of REKResponse Message

| Fields | Description |
| --- | --- |
| Status | Indicate whether the RI successfully processes the RightsRemovalRequest message |
| EncryptedREK | REK encrypted with the public key of the DRM Agent |

The EncryptedREK field is the REK encrypted with the public key of the DRM Agent. The REK is used for decrypting the EncryptedCEK within the <rights> element in the REKRequest message.

In Step 1010, the DRM Agent installs the RO according to the related information of the RO and the REK of the RO.

Figure 11:
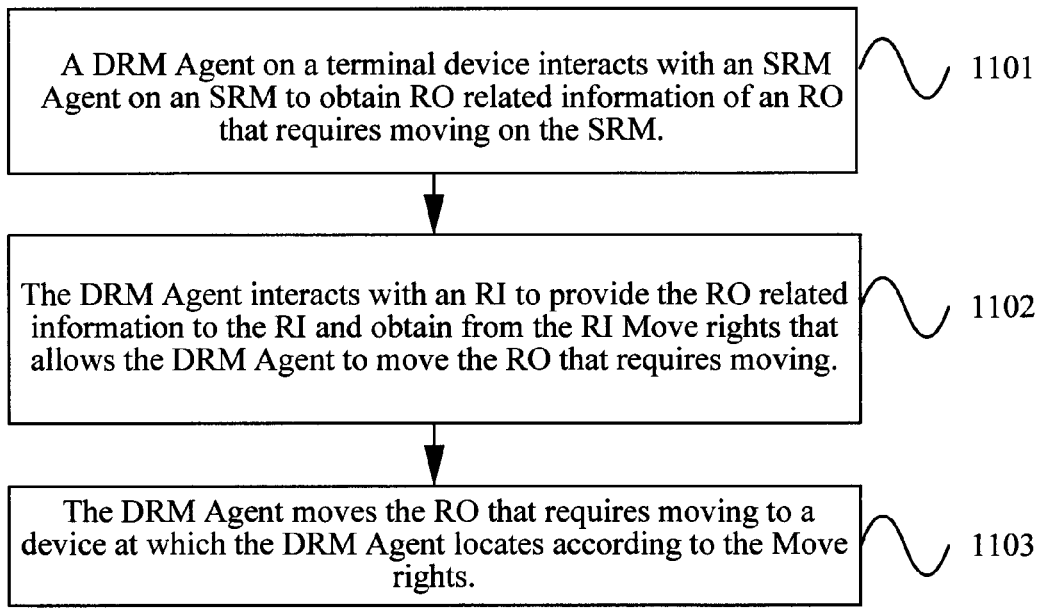
FIG. 11 is a schematic flow chart of a first embodiment of another method for moving an RO according to the present invention.

FIG. 11 is a schematic flow chart of a first embodiment of another method for moving an RO according to the present invention. As shown in FIG. 11, the embodiment includes the following steps.

In Step 1101, the DRM Agent on the terminal device interacts with the SRM Agent on the SRM to obtain the RO related information of the RO that requires moving on the SRM.

In Step 1102, the DRM Agent interacts with the RI to provide the RO related information to the RI, and obtain from the RI the Move rights that allows the DRM Agent to move the RO that requires moving.

In Step 1103, the DRM Agent moves the RO that requires moving to the device at which the DRM Agent locates according to the Move rights.

In this embodiment, the DRM Agent applies to the RI for moving the RO according to the acquired RO related information of the RO that requires moving, and after getting the permission of the RI, compulsively moves the RO from the SRM to the device at which the DRM Agent locates, so as to move the RO without the Move rights out from the SRM, thus extending the application of the RO.

Figure 12:
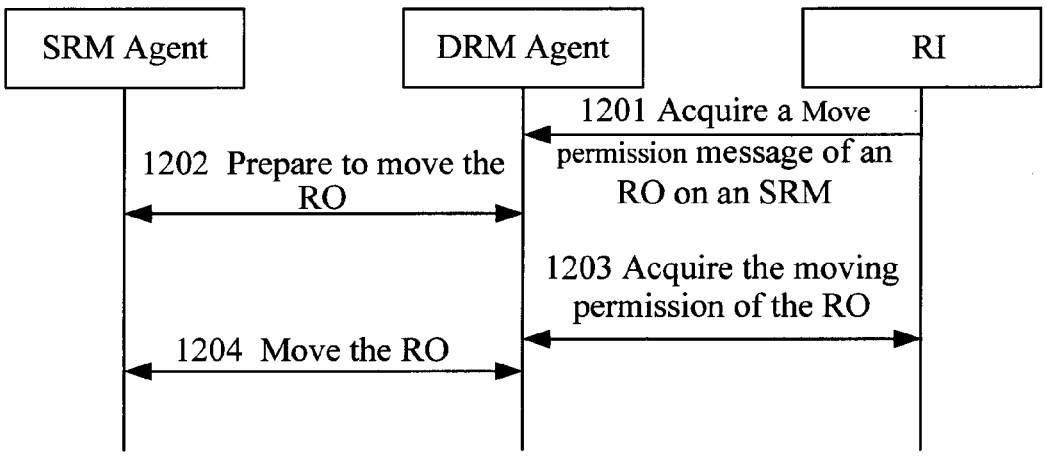
FIG. 12 is a schematic flow chart of a second embodiment of another method for moving an RO according to the present invention.

FIG. 12 is a schematic flow chart of a second embodiment of another method for moving an RO according to the present invention. As shown in FIG. 12, the embodiment includes the following steps.

In Step 1201, the RI sends a Move permission trigger message to the DRM Agent, so as to trigger the DRM Agent to acquire from the RI the permission of allowing the RO without the Move rights on the SRM to be moved out.

Preferably, the Move permission trigger message can include the identifier of the RO that requires moving, so that when receiving the Move permission trigger message, the DRM Agent knows which RO acquires the permission. Before the RI sends the Move permission trigger message, the terminal user needs to access the web site of the RI in virtue of the device at which the DRM Agent locates or the other devices, and submit the request about intending to move the RO in the SRM to its own. After performing such operations as the accounting related operation, the RI may send the Move permission trigger message to the DRM Agent.

The step is an optional step, and the embodiment can also begin directly from Step 1202.

In Step 1202, the DRM Agent interacts with the SRM Agent to prepare to move the RO on the SRM. The preparation work at least includes that the DRM Agent instructs the SRM Agent to set the RO that requires moving to the unavailable status.

Preferably, the DRM Agent can obtain a Existproof indicating that "the RO that requires moving actually exists on the SRM" from the SRM Agent. The form of the proof can be the signature for the REK corresponding to the RO by the SRM Agent.

Preferably, the proof can also include a time stamp, so as to prevent the DRM Agent from repetitively using this proof to get the RO from the RI by defrauding. That is to say, the signature range of the SRM Agent can include a time stamp.

The step is an optional step, and the embodiment can also begin directly from Step 1203.

In Step 1203, the DRM Agent interacts with the RI to acquire the permission about moving out the RO that requires moving on the SRM.

Preferably, the DRM Agent can present a proof indicating that "the RO that requires moving exists on the SRM" to the RI (that is, the signature for the REK by the SRM Agent). After verifying that the RO that requires moving exists on the SRM, the RI sends permission information to the DRM Agent through a message. After receiving the permission information, the DRM Agent can preserve the permission.

Preferably, for the purpose of security, the RI can perform a signature on the permission information.

In Step 1204, the DRM Agent interacts with the SRM Agent to move the RO that requires moving from the SRM to the device.

In the embodiment, after finding that the RO that requires moving does not have the Move rights, the DRM Agent applies to the RI for moving the RO, and compulsively moves the RO that requires moving from the SRM to the device at which the DRM Agent locates after getting the permission of the RI. Although the RO that requires moving itself demonstrates that it does not have the Move rights, with an indication of the permission obtained by the DRM Agent, the DRM Agent still can move the RO that requires moving from the SRM to the device. It may modify appropriately on the basis of the Rights Removal protocol disclosed by the OMA SRM 1.0.

Figure 13:
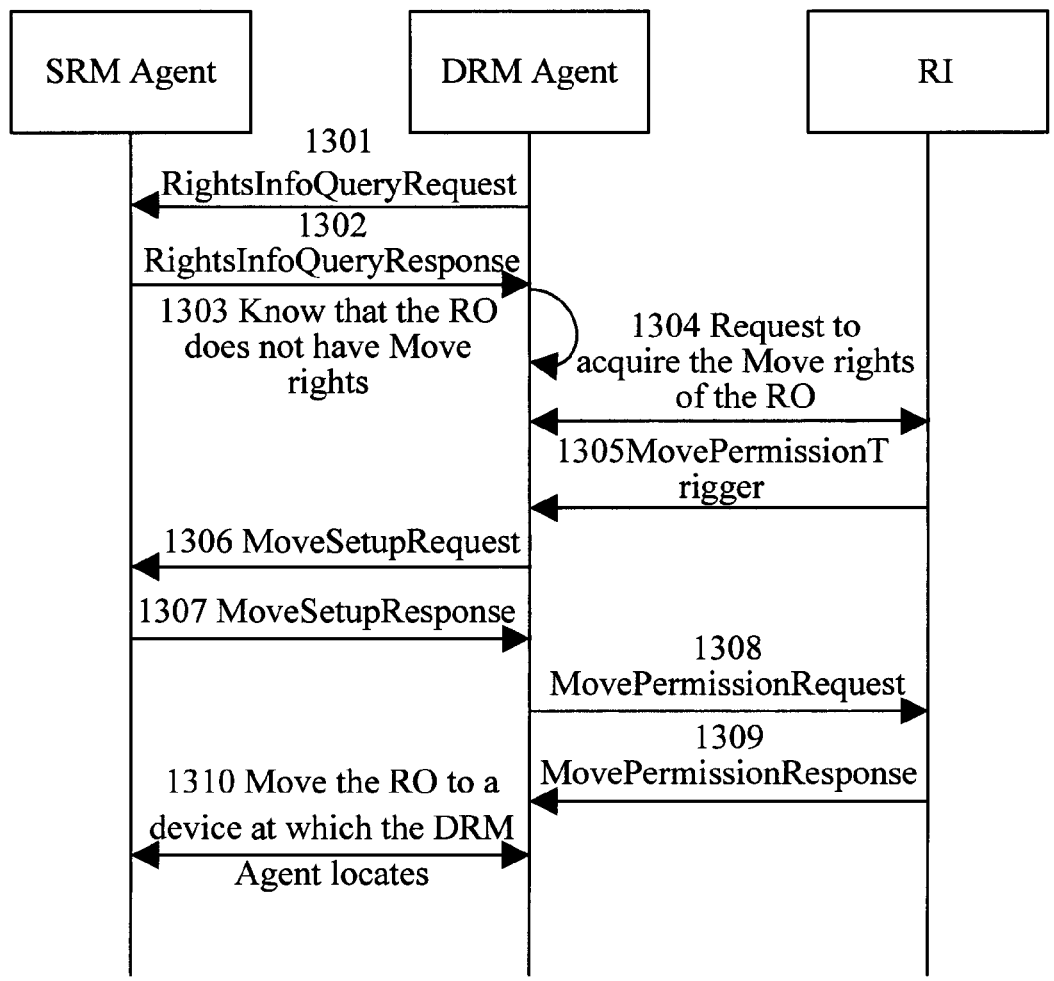
FIG. 13 is a schematic flow chart following interaction protocol reification in the second embodiment of another method for moving an RO according to the present invention.

FIG. 13 is a schematic flow chart following interaction protocol reification in a second embodiment of another method for moving an RO according to the present invention. As shown in FIG. 13, the detailed process includes the following steps.

In Step 1301, the DRM Agent sends the RightsInfoQueryRequest message to the SRM Agent. The RightsInfoQueryRequest message includes the Handle field.

In Step 1302, after receiving the RightsInfoQueryRequest message, the SRM Agent returns the RightsInfoQueryResponse message to the DRM Agent. The RightsInfoQueryResponse message includes the Rights field, the MetaData field, the RO Container field, and the State Information field.

Through the Step 1301 and Step 1302, the DRM Agent obtains from the SRM all information about the RO that requires moving except for the REK, which includes: the <rights> element, the signature for the <rights> element by the RI, the Rights Meta Data, and the corresponding State Information (If the RO has the status RO).

In Step 1303, after receiving the RightsInfoQueryResponse message, the DRM Agent may know that the RO does not have the Move rights according to the <rights> element and the State Information of the RO.

After receiving the RightsInfoQueryResponse message, the DRM Agent may know that the RO does not have the Move rights by analyzing the <rights> element and the State Information of the RO. The device can prompt the user to remove the RO in the manner of popping up a dialogue box.

In Step 1304, the user logs in the web site provided by the RI through the device at which the DRM Agent locates or the other devices, and submits a request about acquiring the Move rights of the RO on the SRM through the page provided by the web site. Preferably, the user may specify the identifier of the RO needed to be moved through the web page.

In Step 1305, after such operations as accounting, the RI sends a MovePermissionTrigger message to the DRM Agent. The MovePermissionTrigger message may be used for triggering the DRM Agent to acquire the Move rights of the RO from the RI. The message includes the ROD field, a MoveRequirementInfo field, and the REKNeeded field. The MoveRequirementInfo is used for representing the detailed move requirements specified by the user, such as the type of the RO that requires moving and the times by which the moving can be performed. The user can specify these requirements through the web page provided by the RI.

In Step 1306, after receiving the MovePermissionTrigger message, the DRM Agent sends a MoveSetupRequest message to the SRM Agent. The MoveSetupRequest message includes the Handle field, the New Handle field, and the REKNeeded field.

In Step 1307, after receiving the Move Setup Request message, the SRM Agent returns a Move Setup Response message to the DRM Agent. The Move Setup Response message includes the ExistProof field and the EncryptedREK field.

In Step 1308, after receiving the MoveSetupResponse message, the DRM Agent sends a MovePermissionRequest message to the RI. The MovePermissionRequest message includes the ROD field, the <rights> field, the <signature> field, the State Information field, a SRMSignOverREK field, the EncryptedREK field, and the MoveRequirementInfo field. These fields can refer to the aforementioned embodiments.

In Step 1309, after receiving the MovePermissionRequest message, the RI returns a MovePermissionResponse message to the DRM Agent. The MovePermissionResponse message includes a MovePermission field. The MovePermission field includes a signature of the following information:

an identifier representing a moving action; and
an identifier of the RO that requires moving.

For the purpose of security, the RI may perform a signature on the MovePermission field, and send it to the DRM Agent together with the MovePermission field.

In Step 1310, the DRM Agent moves the RO that requires moving from the SRM to the device according to the MovePermission field of the RI. The DRM Agent can execute a move operation according to its MovePermission field immediately after receiving the MovePermissionResponse, and may also preserve the MovePermission field, and perform the Move operation in the subsequent time. It depends on the need of the user.

Figure 14:
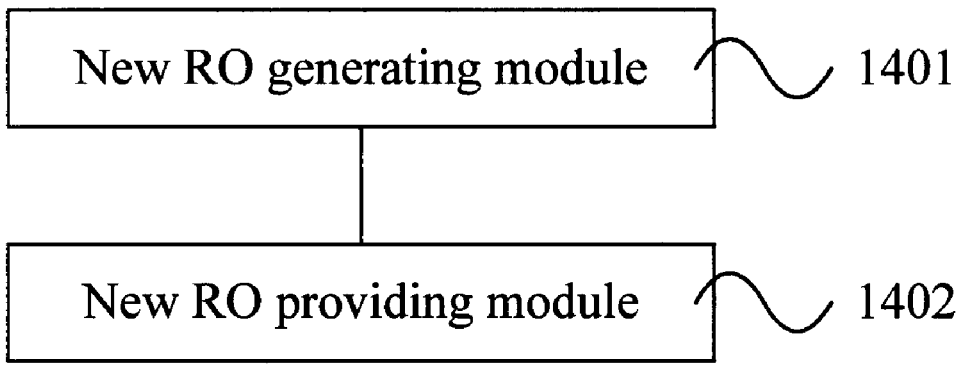
FIG. 14 is a schematic structural view of an embodiment of a Rights Issuer (RI) according to the present invention.

FIG. 14 is a schematic structural view of an embodiment of an RI according to the present invention. As shown in FIG. 14, in the embodiment, the RI includes a new RO generating module 1401 and a new RO providing module 1402.

The new RO generating module 1401 is configured to generate the new RO according to the RO related information of the RO that requires updating on the SRM obtained through the DRM Agent and the SRM Agent.

The new RO providing module 1402 is configured to provide the new RO to the DRM Agent.

Figure 15:
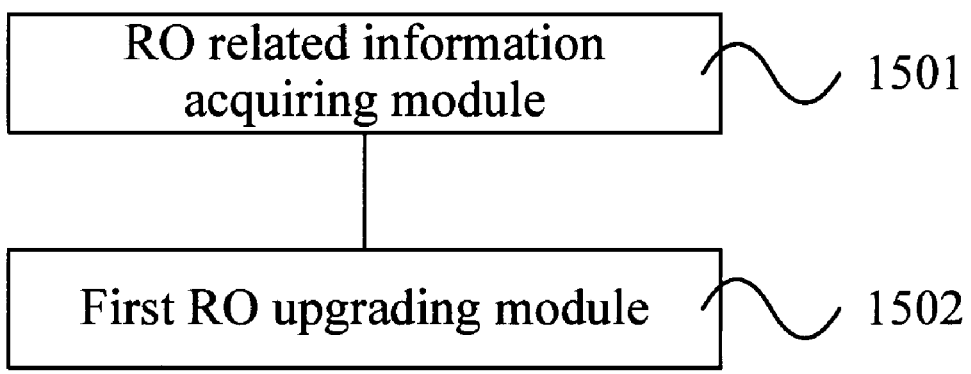
FIG. 15 is a schematic structural view of an embodiment of a Digital Rights Management (DRM) Agent according to the present invention.

FIG. 15 is a schematic structural view of an embodiment of a DRM Agent according to the present invention. As shown in FIG. 15, in the embodiment, the DRM Agent includes an RO related information acquiring module 1501 and a first RO upgrading module 1502.

The RO related information acquiring module 1501 is configured to obtain the RO related information of the RO that requires updating on the SRM from the SRM Agent, and provide the RO related information to the RI.

The first RO upgrading module 1502 is configured to upgrade the RO that requires updating on the SRM with the new RO generated according to the RO related information by the RI through the SRM Agent.

According to the embodiments of the present invention, the embodiment of the RI and the embodiment of the DRM Agent can be used for the processes in the first embodiment and the second embodiment of the method for upgrading the RO according to the present invention.

Figure 16:
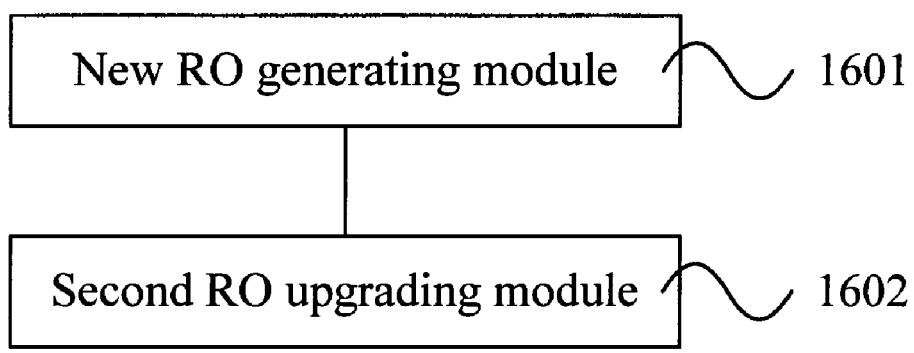
FIG. 16 is a schematic structural view of an embodiment of another RI according to the present invention.

FIG. 16 is a schematic structural view of an embodiment of another RI according to the present invention. As shown in FIG. 16, in the embodiment, the RI includes a new RO generating module 1601 and a second RO upgrading module 1602.

The new RO generating module 1601 is configured to generate the new RO according to the RO related information of the RO that requires updating on the SRM obtained through the DRM Agent and the SRM Agent.

The second RO upgrading module 1602 is configured to upgrade the RO that requires updating on the SRM with the new RO through the DRM Agent and the SRM Agent.

Figure 17:
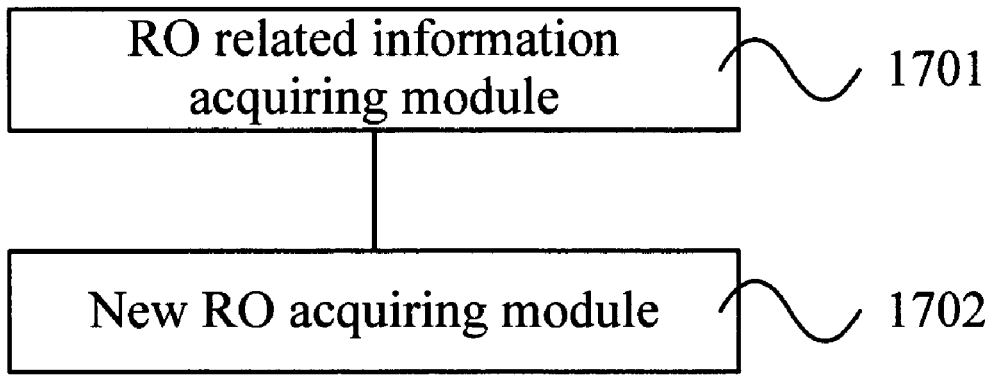
FIG. 17 is a schematic structural view of an embodiment of another DRM Agent according to the present invention.

FIG. 17 is a schematic structural view of an embodiment of another DRM Agent according to the present invention. As shown in FIG. 17, in the embodiment, the DRM Agent includes an RO related information acquiring module 1701 and a new RO acquiring module 1702.

The RO related information acquiring module 1701 is configured to obtain the RO related information of the RO that requires updating on the SRM from the SRM Agent, and provide the RO related information to the RI.

The new RO acquiring module 1702 is configured to obtain the new RO generated according to the RO related information from the RI.

According to the embodiments of the present invention, the embodiment of the another RI and the embodiment of the another DRM Agent can be used for the processes in the first embodiment and the second embodiment of the another method for upgrading the RO according to the present invention.

Figure 18:
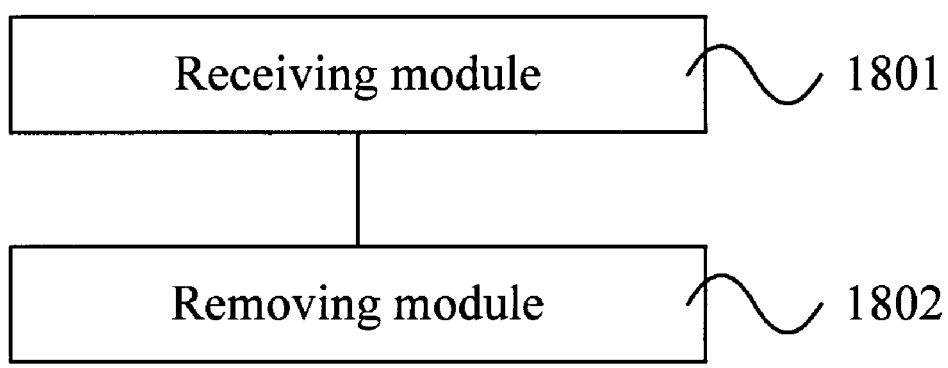
FIG. 18 is a schematic structural view of an embodiment of still another DRM Agent according to the present invention.

FIG. 18 is a schematic structural view of an embodiment of still another DRM Agent according to the present invention. As shown in FIG. 18, in the embodiment, the DRM Agent includes a receiving module 1801 and a removing module 1802.

The receiving module 1801 is configured to receive a trigger message sent by the RI. The trigger message includes the identifier of the RO to be removed on the SRM.

The removing module 1802 is configured to notify the SRM Agent to remove the RO to be removed.

According to the embodiments of the present invention, the embodiment of the still another DRM Agent can be used for the process in the embodiment of the method for removing the RO according to the embodiments of the present invention.

Figure 19:
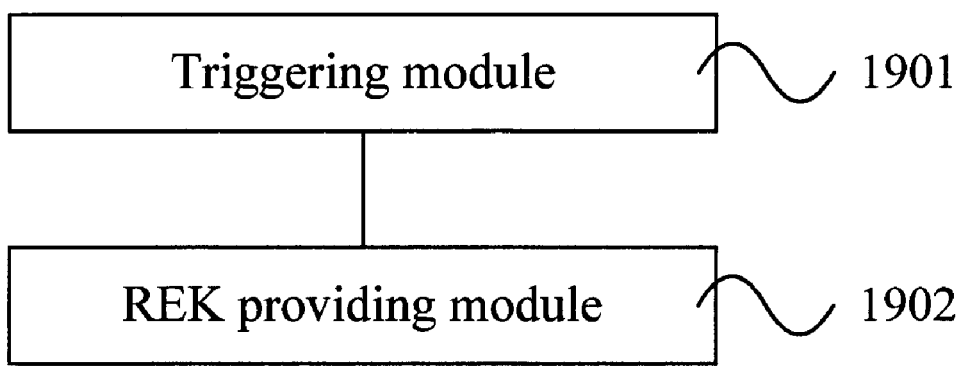
FIG. 19 is a schematic structural view of an embodiment of still another RI according to the present invention.

FIG. 19 is a schematic structural view of still another RI according to an embodiment of the present invention. As shown in FIG. 19, in the embodiment, the RI includes a triggering module 1901 and an REK providing module 1902.

The triggering module 1901 is configured to trigger the DRM Agent to remove the RO that requires moving on the SRM through the SRM Agent after acquiring the RO related information of the RO that requires moving on the SRM through the DRM Agent and the SRM Agent.

The REK providing module 1902 is configured to provide to the DRM Agent the REK of the RO that requires moving.

Figure 20:
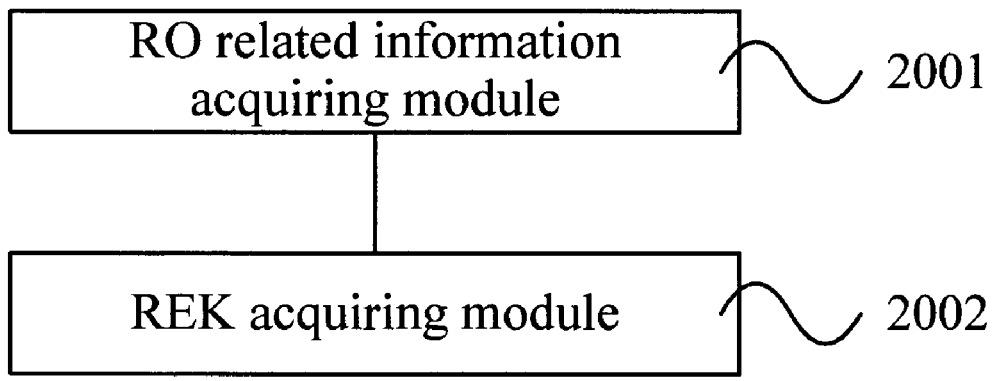
FIG. 20 is a schematic structural view of an embodiment of still another DRM Agent according to the present invention.

FIG. 20 is a schematic structural view of an embodiment of still another DRM Agent according to the present invention. As shown in FIG. 20, in the embodiment, the DRM Agent includes an RO related information acquiring module 2001 and an REK acquiring module 2002.

The RO related information acquiring module 2001 is configured to obtain the RO related information of the RO that requires updating on the SRM from the SRM Agent, and provide the RO related information to the RI.

The REK acquiring module 2002 is configured to receive the REK of the RO that requires moving that are provided by the RI.

According to the embodiments of the present invention, the embodiment of the still another RI and the embodiment of the still another DRM Agent can be used for the processes in the first embodiment and the second embodiment of the method for moving the RO according to the present invention.

Figure 21:
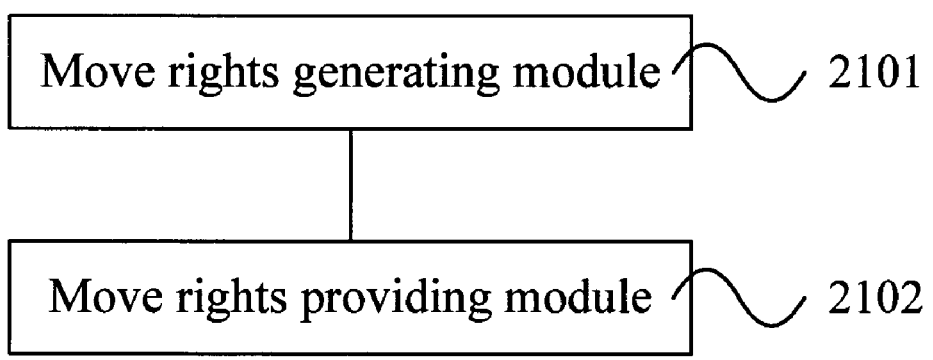
FIG. 21 is a schematic structural view of an embodiment of still another RI according to the present invention.

FIG. 21 is a schematic structural view of an embodiment of still another RI according to the present invention. As shown in FIG. 21, in the embodiment, the RI includes a Move rights generating module 2101 and a Move rights providing module 2102.

The Move rights generating module 2101 is configured to generate the Move rights of the RO that requires moving according to the RO related information of the RO that requires moving on the SRM acquired through the DRM Agent and the SRM Agent.

The Move rights providing module 2102 is configured to provide to the DRM Agent the Move rights of the RO that requires moving.

Figure 22:
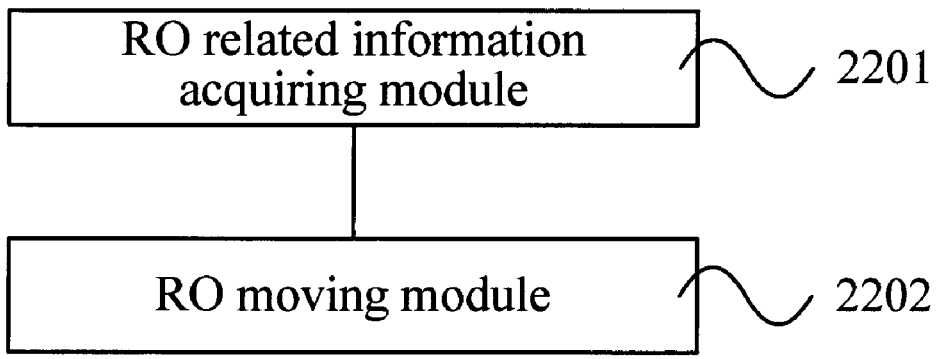
FIG. 22 is a schematic structural view of an embodiment of still another DRM Agent according to the present invention.

FIG. 22 is a schematic structural view of an embodiment of still another DRM Agent according to the present invention. As shown in FIG. 22, in the embodiment, the DRM Agent includes an RO related information acquiring module 2201 and an RO moving module 2202.

The RO related information acquiring module 2201 is configured to obtain the RO related information of the RO that requires updating on the SRM from the SRM Agent, and provide the RO related information to the RI.

The RO moving module 2202 is configured to receive the Move rights, provided by the RI, of the RO that requires moving and move the RO that requires moving to the device at which the DRM Agent locates through the SRM Agent according to the Move rights.

According to the embodiments of the present invention, the embodiment of the still another RI and the embodiment of the still another DRM Agent can be used for the processes in the first embodiment and the second embodiment of the another method for moving the RO according to the present invention.

Figure 23:
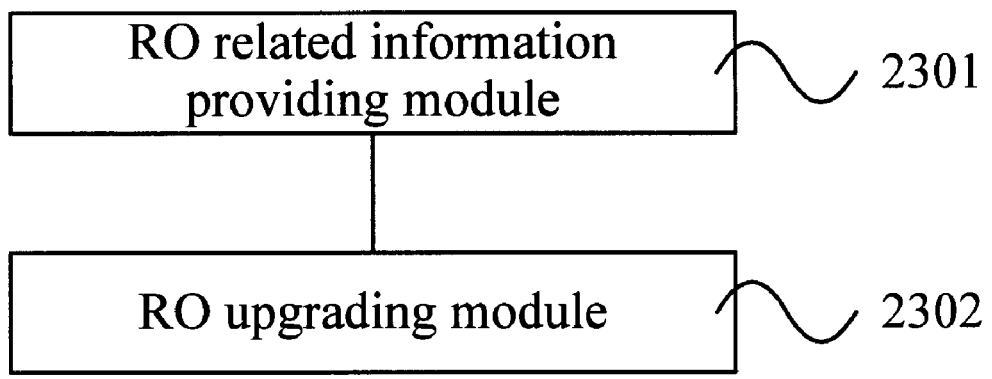
FIG. 23 is a schematic structural view of an embodiment of a Secure Removable Media (SRM) Agent according to the present invention.

FIG. 23 is a schematic structural view of an embodiment of an SRM Agent according to the present invention. As shown in FIG. 23, in the embodiment, the SRM Agent includes an RO related information providing module 2301 and an RO upgrading module 2302.

The RO related information providing module 2301 is configured to provide the RO related information of the RO that requires updating to the DRM Agent.

The RO upgrading module 2302 is configured to receive the new RO generated according to the RO related information of the RO that requires updating and sent by the DRM Agent, and upgrade the RO that requires updating.

Figure 24:
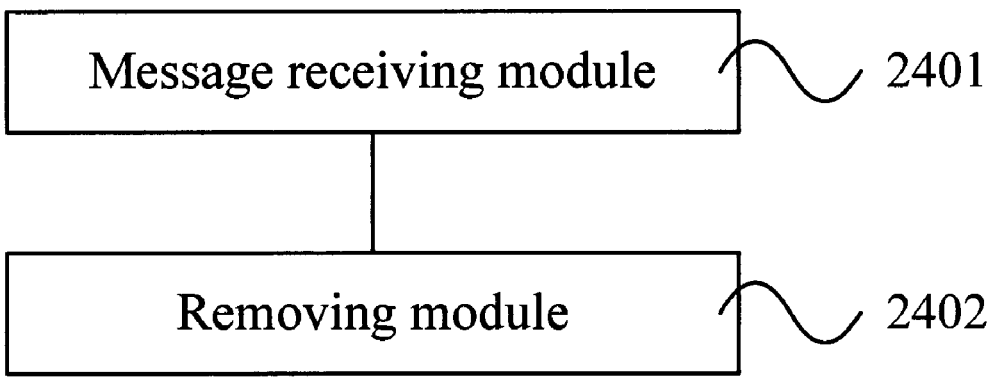
FIG. 24 is a schematic structural view of an embodiment of another SRM Agent according to the present invention.

FIG. 24 is a schematic structural view of an embodiment of another SRM Agent according to the present invention. As shown in FIG. 24, in the embodiment, the SRM Agent includes a message receiving module 2401 and a removing module 2402.

The message receiving module 2401 is configured to receive the RightsRemovalRequest message sent by the DRM Agent.

The removing module 2402 is configured to remove the RO to be removed according to the received RightsRemovalRequest message, and return the RemovalProof to the DRM Agent.

According to the embodiments of the present invention, the DRM Agent interacts with the RI with the acquired RO related information which is stored on the SRM and does not have the Move rights, so as to acquire the new RO or the Move rights from the RI, and move the RO out from the SRM, so that the RO without the Move rights can be moved out from the SRM, thus extending the application of the RO without the Move rights.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, and an optical disk.

It should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method for upgrading a Rights Object (RO), comprising:
   receiving, by a Digital Rights Management (DRM) Agent of a terminal device, a RO Upgrade message, comprising and identifier of the RO that requires updating;
   instructing, by the DRM Agent, a Secure Removable Media (SRM) Agent of a SRM to set the RO that requires updating to an unavailable status;
   acquiring, by the DRM Agent of the terminal device and from the SRM agent, an indication that the RO that requires updating actually exists in the SRM through an existence of the identifier of the RO and a digital signature therein;
   providing, by the DRM Agent of the terminal device, the RO related information to a Rights Issuer (RI);
   obtaining, by the DRM Agent, a new RO from the RI; and
   interacting, by the DRM Agent of the terminal device, with the SRM Agent to upgrade the RO that requires updating on the SRM by means of the new RO to install the new RO to the SRM through the SRM Agent.

2. The method according to claim 1, wherein before obtaining, by the DRM Agent, the new RO from the RI, the method further comprises:
   receiving, by the DRM Agent of the terminal device, a Rights Upgrade Setup Response message carrying a field for demonstrating existence of the RO that requires updating on the SRM transferred by the SRM Agent of the SRM;
   sending, by the DRM Agent of the terminal device, a SRM RO Upgrade Request message carrying a field for demonstrating existence of the RO that requires updating on the SRM to the RI; and
   sending the new RO to the DRM Agent after passing a verification for the SRM RO Upgrade Request message carrying the field for demonstrating existence of the RO that requires updating on the SRM by the RI.

3. The method according to claim 1, wherein before obtaining the new RO from the RI, the method further comprises setting, by the SRM Agent of the SRM, the RO that requires updating to the unavailable status.

4. The method according to claim 1, wherein before obtaining the new RO from the RI, the method further comprises transferring a RO upgrading requirement information to the RI.

5. The method according to claim 1, wherein, interacting, by the DRM Agent of the terminal device, with the SRM Agent of the SRM to upgrade the RO that requires updating on the SRM by the new RO comprises:
   obtaining, by the DRM Agent of the terminal device, RO related information of the new RO and a Rights Encryption Key (REK) of the new RO from the new RO, wherein the REK of the new RO is encrypted in a manner that the RI is capable of decrypting with the SRM Agent;
   sending, by the DRM Agent of the terminal device, the RO related information of the new RO and the REK of the new RO to the SRM Agent;
   decrypting, by the SRM Agent of the SRM, the REK of the new RO to get a decrypted REK; and
   storing the RO related information of the new RO and the REK plain text in the SRM.

6. The method according to claim 1, wherein upgrading the RO that requires updating on the SRM by means of the new RO comprises:
   transferring, by the DRM Agent of the terminal device, the new RO to the SRM Agent of the SRM, and replacing, by the SRM Agent of the SRM, the RO that requires updating with the new RO; or
   transferring, by the DRM Agent of the terminal device, the new RO to the SRM Agent of the SRM after removing the RO that requires updating through the SRM Agent of the SRM, and installing, by the SRM Agent of the SR, the new RO to the SRM.

7. The method according to claim 6, wherein after removing the RO that required updating through the SRM Agent, the DRM Agent acquires from the SRM Agent a RemovalProof for demonstrating that the RO that required updating has been removed from the SRM, wherein after the SRM Agent installs the new RO, the DRM Agent of the terminal device receives a SRM RO Upgrade Confirm Request message and a message for demonstrating that the new RO has been installed to the SRM, wherein the SRM RO Upgrade Confirm Request message carries a field for demonstrating that the RO to be removed has been removed from the SRM, and wherein the DRM Agent transfers the RemovalProof and the message for demonstrating that the new RO has been installed to the SRM to the RI to demonstrate that the replacement of the RO that required updating with the new RO has been completed.

8. The method according to claim 7, wherein the RemovalProof comprises a signature for third information by the SRM wherein the third information comprises at least one of the following information: a REK of the RO that requires updating, an identifier of the RO that requires updating, an identifier of the DRM Agent, an identifier representing a removing action, and a time that the RO that required updating was removed, wherein the InstallationProof comprises a signature for fourth information by the SRM, and wherein the fourth information comprises at least one of the following information: a REK of the new RO, an identifier of the new RO, the identifier of the DRM Agent, an identifier representing an installation action, and a time that the new RO was installed.

9. The method according to claim 1, wherein after or during the upgrading the RO that requires updating on the SRM by means of the new RO, the method further comprises notifying, by the DRM Agent of the terminal device, the RI that replacement of the RO that required updating with the new RO has been completed.

10. The method according to claim 9, wherein after the upgrading the RO that required updating on the SRM by means of the new RO, the method further comprises:
   receiving, by the DRM Agent of the terminal device and from the SRM Agent of the SRM a RightsReplaceResponse message carrying a field for demonstrating that the RO that required updating has been replaced with the new RO; and
   sending, by the DRM Agent of the terminal device, an SRM RO Upgrade Confirm Request message to the RI, wherein the SRM RO Upgrade Confirm Request message carries a field for demonstrating that the RO to be removed has been removed from the SRM.

11. A method for upgrading a Rights Object (RO), comprising:
   acquiring, by a Rights Issuer (RI) device, RO related information of the RO from a Digital Rights Management (DRM) Agent that requires updating on a Secure Removable Media (SRM) through the (DRM) Agent of a terminal device and an SRM Agent of the SRM, wherein the acquired RO related information comprises an identifier of the RO and a digital signature; and
   triggering, by the RI device, the DRM Agent of the terminal device to obtain a new RO from the RI device after the RI device confirms, via the SRM agent, that the RO that required updating has been removed from the SRM, and installing the RO to the SRM through the DRM Agent of the terminal device.

12. The method according to claim 11, wherein removing the RO that requires updating from the SRM comprises triggering, by the RI device, the DRM Agent of the terminal device to interact with the SRM Agent of the SRM to remove the RO that requires updating on the SRM.

13. The method according to claim 11, wherein before obtaining, by the DRM Agent of the terminal device, the new RO from the RI device, the method further comprises:
   obtaining, by the DRM Agent of the terminal device, a Rights Encryption Key (REK) of the RO that requires updating encrypted by the SRM Agent of the SRM in a manner that the RI is capable of decrypting;
   transferring, by the DRM Agent of the terminal device, the encrypted REK to the RI; and
   decrypting, by the RI, the encrypted REK to get an REK plain text to verify the RO that requires updating.

14. The method according to claim 11, wherein confirming, by the RI device, that the RO that required updating has been removed from the SRM comprises confirming, by the RI device, that the RO that required updating has been removed from the SRM by verifying a RemovalProof, and wherein the RemovalProof is provided by the SRM Agent and transferred to the RI via the DRM Agent of the terminal device.

15. A method for removing a Rights Object (RO), comprising:
   receiving, by a Digital Rights Management (DRM) Agent of a terminal device, a trigger message sent by a Rights Issuer (RI) device, wherein the trigger message comprises an identifier of an RO to be removed on a Secure Removable Media (SRM) and a digital signature; and
   interacting, by the DRM Agent of the terminal device, with an SRM Agent of the SRM to remove the RO to be removed;
   acquiring, by the RI and via the DRM Agent, at least a confirmation from a SRM Agent indicating the RO has been removed from the SRM;
   triggering, by the DRN Agent to obtain a new RO from the RI after the RI receives the RO removal confirmation; and
   installing the new RO to the SRM through the DRM Agent.

16. The method according to claim 15, wherein after removing the RO to be removed, the method further comprises notifying the RI device that removal of the RO to be removed has been completed.

17. The method according to claim 16, wherein notifying the RI device that the removal of the RO to be removed has been completed comprises:
   receiving, by the DRM Agent of the terminal device, a Rights Replace Response message carrying a field for demonstrating that the RO to be removed has been removed from the SRM returned by the SRM Agent; and
   sending, by the DRM of the terminal device, an SRM RO Upgrade Confirm Request message to the RI, wherein the SRM RO Upgrade Confirm Request message carries a field for demonstrating that the RO to be removed has been removed from the SRM.

18. A terminal device, comprising:
   at least one processor or circuit;
   a Rights Object (RO) related information acquiring module, configured by the processor or circuit to receive an ROUpgrade Trigger message comprising an identifier of a RO that requires updating, to instruct a Secure Removable Media (SRM) of a SRM to set the RO to an unavailable status, to acquire from the SRM Agent an Exist-Proof indicating that the RO that requires updating actually exists in the SRM, wherein the Existproof includes the identifier of the RO and a digital signature, to provide the RO related information to a Rights Issuer (RI), and to obtain a new RO from the RI; and
   a first RO upgrading module, configured to interact with the SRM Agent to upgrade the RO that requires updating on the SRM with the new RO generated according to the RO related information by the RI through the SRM Agent to install the new RO to the SRM through the SRM Agent.

* * * * *

UNITED STATES PATENT AND TRADEMARK OFFICE
CERTIFICATE OF CORRECTION

PATENT NO. : 8,353,055 B2
APPLICATION NO. : 13/540212
DATED : January 8, 2013
INVENTOR(S) : Renzhou Zhang et al.

It is certified that error appears in the above-identified patent and that said Letters Patent is hereby corrected as shown below:

Column 27 Lines 15-34, Claim 1 should read:

1. A method for upgrading a Rights Object (RO), comprising:
receiving, by a Digital Rights Management (DRM) Agent of a terminal device, a RO Upgrade message, comprising an identifier of the RO that requires updating;
instructing, by the DRM Agent, a Secure Removable Media (SRM) Agent of a SRM to set the RO that requires updating to an unavailable status;
acquiring, by the DRM Agent of the terminal device and from the SRM agent, an indication that the RO that requires updating actually exists in the SRM through an existence of the identifier of the RO and a digital signature therein;
providing, by the DRM Agent of the terminal device, the RO related information to a Rights Issuer (RI); obtaining, by the DRM Agent, a new RO from the RI; and
interacting, by the DRM Agent of the terminal device, with the SRM Agent to upgrade the RO that requires updating on the SRM by means of the new RO to install the new RO to the SRM through the SRM Agent.

Columns 27-28 Lines 59-7, Claim 5 should read:

5. The method according to claim 1, wherein interacting, by the DRM Agent of the terminal device, with the SRM Agent of the SRM to upgrade the RO that requires updating on the SRM by the new RO comprises:
obtaining, by the DRM Agent of the terminal device, RO related information of the new RO and a Rights Encryption Key (REK) of the new RO from the new RO, wherein the REK of the new RO is encrypted in a manner that RI is capable of decrypting with the SRM Agent;
sending, by the DRM Agent of the terminal device, the RO related information of the new RO and the REK of the new RO to the SRM Agent;
decrypting, by the SRM Agent of the SRM, the REK of the new RO to get a decrypted REK; and
storing the RO related information of the new RO and the REK plain text in the SRM.

Signed and Sealed this
Ninth Day of April, 2013

Teresa Stanek Rea
*Acting Director of the United States Patent and Trademark Office*

CERTIFICATE OF CORRECTION (continued)
U.S. Pat. No. 8,353,055 B2

Column 28 Lines 8-19, Claim 6 should read:

6. The method according to claim 1, wherein upgrading the RO that requires updating on the SRM by means of the new RO comprises:
transferring, by the DRM Agent of the terminal device, the new RO to the SRM Agent of the SRM, and replacing, by the SRM Agent of the SRM, the RO that requires updating with the new RO; or transferring, by the DRM Agent of the terminal device, the new RO to the SRM Agent of the SRM after removing the RO that requires updating through the SRM Agent of the SRM, and installing, by the SRM Agent of the SRM, the new RO to the SRM.

Column 28 Lines 35-48, Claim 8 should read:

8. The method according to claim 7, wherein the RemovalProof comprises a signature for third information by the SRM, wherein the third information comprises at least one of the following information: a REK of the RO that requires updating, an identifier of the RO that requires updating, an identifier of the DRM Agent, an identifier representing a removing action, and a time that the RO that required updating was removed, wherein the InstallationProof comprises a signature for fourth information by the SRM, and wherein the fourth information comprises at least one of the following information: a REK of the new RO, an identifier of the new RO, the identifier of the DRM Agent, an identifier representing an installation action, and a time that the new RO was installed.

Column 29 Lines 1-15, Claim 11 should read:

11. A method for upgrading a Rights Object (RO), comprising:
acquiring, by a Rights Issuer (RI) device, RO related information of the RO from a Digital Rights Management (DRM) Agent that requires updating on a Secure Removable Media (SRM) through the DRM Agent of a terminal device and an SRM Agent of the SRM, wherein the acquired RO related information comprises an identifier of the RO and a digital signature; and
triggering, by the RI device, the DRM Agent of the terminal device to obtain a new RO from the RI device after the RI device confirms, via the SRM agent, that the RO that required updating has been removed from the SRM, and installing the RO to the SRM through the DRM Agent of the terminal device.

Columns 29-30 Lines 40-10, Claim 15 should read

15. A method for removing a Rights Object (RO), comprising:
receiving, by a Digital Rights Management (DRM) Agent of a terminal device, a trigger message sent by a Rights Issuer (RI) device, wherein the trigger message comprises an identifier of an RO to be removed on a Secure Removable Media (SRM) and a digital signature; and
interacting, by the DRM Agent of the terminal device, with an SRM Agent of the SRM to remove the RO to be removed;
acquiring, by the RI and via the DRM Agent, at least a confirmation from a SRM Agent indicating the RO has been removed from the SRM;

triggering, by the RI, the DRM Agent to obtain a new RO from the RI after the RI receives the RO removal confirmation; and installing the new RO to the SRM through the DRM Agent.